(12) United States Patent
Taylor et al.

(10) Patent No.: US 8,594,557 B2
(45) Date of Patent: Nov. 26, 2013

(54) INTERACTIVE ELECTRONIC DEVICE WITH OPTICAL PAGE IDENTIFICATION SYSTEM

(75) Inventors: John W. Taylor, Cowlesville, NY (US); James P. Meade, Hamburg, NY (US); Christopher D. Cimerman, Clarence Center, NY (US); Stephen M. Ernst, Colorado Springs, CO (US)

(73) Assignee: Mattel, Inc., El Segundo, CA (US)

( * ) Notice: Subject to any disclaimer, the term of this patent is extended or adjusted under 35 U.S.C. 154(b) by 24 days.

(21) Appl. No.: 13/156,080

(22) Filed: Jun. 8, 2011

(65) Prior Publication Data
US 2011/0236869 A1  Sep. 29, 2011

Related U.S. Application Data

(60) Continuation of application No. 12/141,552, filed on Jun. 18, 2008, now abandoned, which is a division of application No. 10/767,321, filed on Jan. 29, 2004, now abandoned.

(60) Provisional application No. 60/443,967, filed on Jan. 31, 2003.

(51) Int. Cl.
*G09B 5/00* (2006.01)
(52) U.S. Cl.
USPC .......................................... 434/317; 434/308
(58) Field of Classification Search
USPC .......................................... 434/353, 350, 322
See application file for complete search history.

(56) References Cited

U.S. PATENT DOCUMENTS

| | | | |
|---|---|---|---|
| 3,448,282 A | 6/1969 | Fleisher et al. | |
| 3,529,832 A | 9/1970 | Goetz et al. | |
| 3,553,851 A | 1/1971 | Paige | |
| 3,692,983 A * | 9/1972 | Cucciati et al. | 235/458 |
| 3,738,021 A | 6/1973 | Hino et al. | |
| 3,875,331 A * | 4/1975 | Hasenbalg | 178/18.01 |
| 3,959,627 A * | 5/1976 | Sonier | 235/458 |
| 3,990,780 A | 11/1976 | Dakss | |
| 4,054,795 A * | 10/1977 | Kinder | 250/205 |
| 4,055,747 A * | 10/1977 | Jensen | 235/458 |
| 4,230,265 A * | 10/1980 | Casaly | 235/455 |
| 4,302,011 A * | 11/1981 | Pepper, Jr. | 463/37 |
| 4,355,984 A | 10/1982 | Slavik et al. | |
| 4,418,278 A | 11/1983 | Mondshein | |
| 4,442,317 A * | 4/1984 | Jandrell | 178/18.01 |
| 4,476,463 A * | 10/1984 | Ng et al. | 345/174 |
| 4,636,881 A | 1/1987 | Brefka et al. | |
| 4,652,741 A * | 3/1987 | Golborne | 250/221 |
| 4,672,195 A * | 6/1987 | Golborne et al. | 250/221 |
| 4,685,074 A * | 8/1987 | May et al. | 382/144 |
| 4,694,153 A * | 9/1987 | Bejczy et al. | 250/202 |
| 4,703,573 A | 11/1987 | Montgomery et al. | |
| 4,794,208 A * | 12/1988 | Watson | 178/19.06 |

(Continued)

*Primary Examiner* — Robert J Utama
(74) *Attorney, Agent, or Firm* — Panitch Schwarze Belisario & Nadel LLP

(57) ABSTRACT

An electronic learning device for receiving a book having a plurality of successive page spreads, at least one page spread having selectable content and an optically readable page identifier. The device includes a housing configured to receive the book, a position sensor in the housing configured to determine the location of the selectable content on the at least one page spread, an optical sensor in the housing configured to irradiate and detect the page identifier on the at least one page spread and control electronics in the housing operatively coupled to the optical sensor and to the position sensor and configured to synchronize sequential operation of the position sensor and the optical sensor.

18 Claims, 19 Drawing Sheets

(56) References Cited

U.S. PATENT DOCUMENTS

| | | | |
|---|---|---|---|
| 4,809,246 A * | 2/1989 | Jeng | 434/317 |
| 4,818,827 A | 4/1989 | Ipcinski et al. | |
| 4,820,233 A | 4/1989 | Weiner | |
| 4,884,974 A * | 12/1989 | DeSmet | 434/317 |
| 4,990,092 A | 2/1991 | Cummings | |
| 5,149,919 A * | 9/1992 | Greanias et al. | 178/18.02 |
| 5,167,508 A | 12/1992 | Mc Taggart | |
| 5,174,759 A | 12/1992 | Preston et al. | |
| 5,188,533 A | 2/1993 | Wood | |
| 5,191,329 A * | 3/1993 | Samreus | 341/20 |
| 5,209,665 A | 5/1993 | Billings et al. | |
| 5,270,711 A * | 12/1993 | Knapp | 341/34 |
| 5,290,190 A | 3/1994 | McClanahan | |
| 5,356,296 A | 10/1994 | Pierce et al. | |
| 5,374,195 A | 12/1994 | McClanahan | |
| 5,376,947 A * | 12/1994 | Kuroda | 345/173 |
| 5,386,219 A * | 1/1995 | Greanias et al. | 345/174 |
| 5,417,575 A | 5/1995 | McTaggart | |
| 5,466,158 A * | 11/1995 | Smith, III | 434/317 |
| 5,484,292 A | 1/1996 | McTaggart | |
| 5,485,176 A | 1/1996 | Ohara et al. | |
| 5,511,980 A * | 4/1996 | Wood | 434/169 |
| 5,520,544 A * | 5/1996 | Manico et al. | 434/317 |
| 5,538,430 A | 7/1996 | Smith et al. | |
| 5,569,868 A | 10/1996 | Leung | |
| 5,631,883 A | 5/1997 | Li | |
| 5,707,240 A | 1/1998 | Haas et al. | |
| 5,739,814 A * | 4/1998 | Ohara et al. | 345/173 |
| 5,742,279 A * | 4/1998 | Yamamoto et al. | 345/173 |
| 5,784,291 A * | 7/1998 | Chen et al. | 712/32 |
| 5,810,604 A | 9/1998 | Kopp, Jr. et al. | |
| 5,831,600 A * | 11/1998 | Inoue et al. | 345/173 |
| 5,861,583 A * | 1/1999 | Schediwy et al. | 178/18.06 |
| 5,897,324 A | 4/1999 | Tan | |
| 5,932,863 A | 8/1999 | Rathus et al. | |
| 5,954,515 A | 9/1999 | Iggulden | |
| 6,041,215 A | 3/2000 | Maddrell et al. | |
| 6,064,855 A * | 5/2000 | Ho | 434/317 |
| 6,124,851 A * | 9/2000 | Jacobson | 345/206 |
| 6,201,947 B1 | 3/2001 | Hur et al. | |
| 6,269,238 B1 | 7/2001 | Iggulden | |
| 6,330,247 B1 | 12/2001 | Chang et al. | |
| 6,416,326 B1 | 7/2002 | Oh | |
| 6,437,335 B1 * | 8/2002 | Bohn | 250/360.1 |
| 6,491,220 B1 | 12/2002 | May | |
| 6,668,156 B2 | 12/2003 | Lynch et al. | |
| 6,729,543 B1 * | 5/2004 | Arons et al. | 235/462.13 |
| 6,781,570 B1 * | 8/2004 | Arrigo et al. | 345/158 |
| 6,865,367 B2 * | 3/2005 | Kim et al. | 434/317 |
| 6,868,198 B2 * | 3/2005 | Sunaga et al. | 385/18 |
| 7,111,774 B2 * | 9/2006 | Song | 235/375 |
| 7,290,700 B2 * | 11/2007 | Song | 235/375 |
| 7,402,042 B2 * | 7/2008 | Kelley et al. | 434/178 |
| 7,511,585 B2 * | 3/2009 | Lin | 331/65 |
| 2002/0054372 A1 | 5/2002 | Takahashi | |
| 2002/0175901 A1* | 11/2002 | Gettemy | 345/175 |
| 2003/0116620 A1 | 6/2003 | Song | |
| 2003/0175672 A1 | 9/2003 | Kim et al. | |
| 2004/0026605 A1* | 2/2004 | Lee et al. | 250/221 |
| 2004/0043365 A1 | 3/2004 | Kelley et al. | |
| 2004/0043371 A1 | 3/2004 | Ernst et al. | |
| 2004/0070192 A1 | 4/2004 | Kelley et al. | |
| 2004/0076935 A1 | 4/2004 | Kelley et al. | |
| 2004/0107065 A1* | 6/2004 | Al-Ali | 702/104 |
| 2004/0178995 A1* | 9/2004 | Sterling | 345/173 |
| 2004/0219501 A1 | 11/2004 | Small et al. | |
| 2008/0254428 A1 | 10/2008 | Taylor et al. | |

* cited by examiner

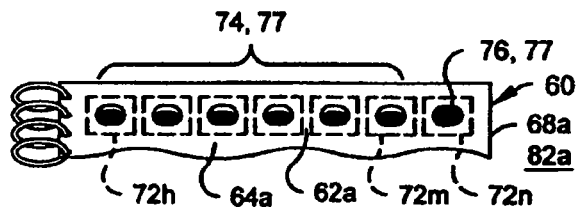
*Fig. 4A*
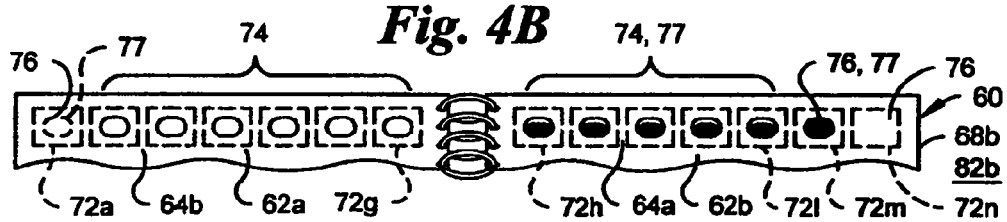
*Fig. 4B*
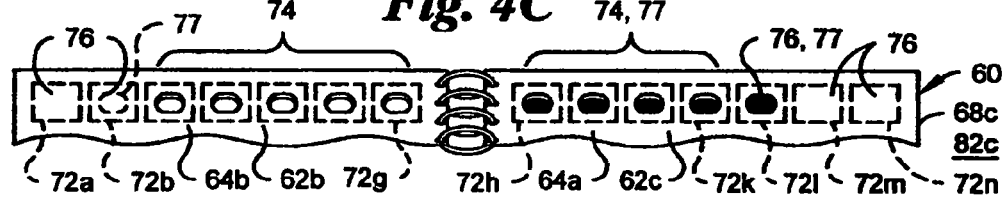
*Fig. 4C*
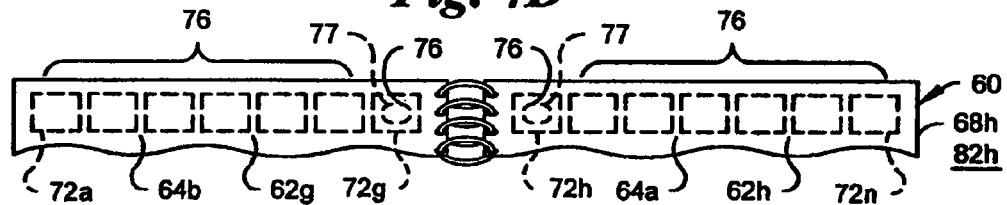
*Fig. 4D*
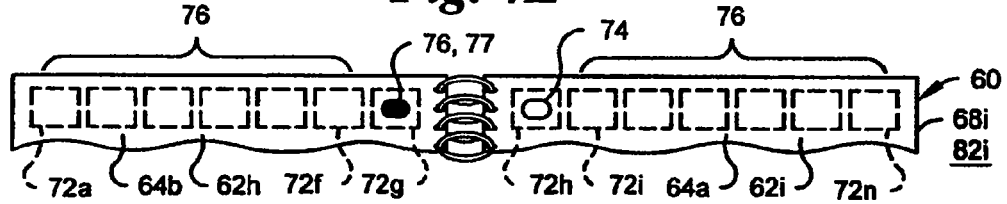
*Fig. 4E*
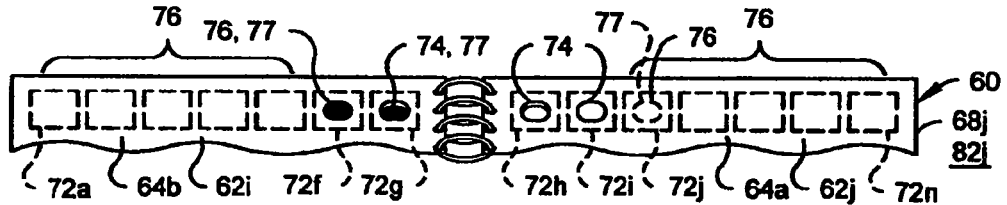
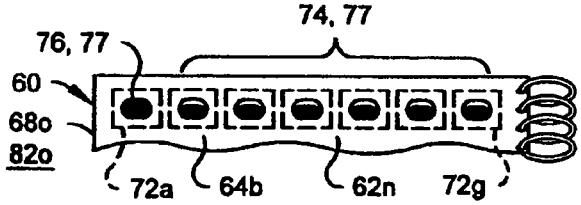
*Fig. 4F*
*Fig. 4G*

Fig. 5

| First through Fifteenth Page Spreads, 68a through 68o | Corresponding First through Fifteenth Page Identifiers, 82a through 82o | Open-hole, Closed-hole Status at Hole Locations 72a through 72n |||||||||||||||
|---|---|---|---|---|---|---|---|---|---|---|---|---|---|---|
| | | 72a | 72b | 72c | 72d | 72e | 72f | 72g | 72h | 72i | 72j | 72k | 72l | 72m | 72n |
| 68a | 82a | . | . | . | . | . | . | . | . | . | . | . | . | . | F |
| 68b | 82b | C | O | O | O | O | O | O | O | O | O | O | O | F | C |
| 68c | 82c | C | C | O | O | O | O | O | O | O | O | O | F | C | C |
| 68d | 82d | C | C | C | O | O | O | O | O | O | O | F | C | C | C |
| 68e | 82e | C | C | C | C | O | O | O | O | O | F | C | C | C | C |
| 68f | 82f | C | C | C | C | C | O | O | O | F | C | C | C | C | C |
| 68g | 82g | C | C | C | C | C | C | O | F | C | C | C | C | C | C |
| 68h | 82h | C | C | C | C | C | C | F | C | C | C | C | C | C | C |
| 68i | 82i | C | C | C | C | C | F | C | O | C | C | C | C | C | C |
| 68j | 82j | C | C | C | C | F | O | O | O | O | C | C | C | C | C |
| 68k | 82k | C | C | C | F | O | O | O | O | O | O | C | C | C | C |
| 68l | 82l | C | C | F | O | O | O | O | O | O | O | O | C | C | C |
| 68m | 82m | C | F | O | O | O | O | O | O | O | O | O | O | C | C |
| 68n | 82n | F | O | O | O | O | O | O | O | O | O | O | O | O | C |
| 68o | 82o | . | . | . | . | . | . | . | . | . | . | . | . | . | . |

{ 78 groups rows 68a–68g; 80 groups rows 68h–68o }

| Legend |
|---|
| O = HOLE IN PAGE |
| C = NO HOLE IN PAGE |
| F = FOIL PAD ON CLOSED HOLE OF UPPERMOST PAGE |
| . = PAGE NOT PRESENT (EQUIVALENT TO OPEN HOLE) |

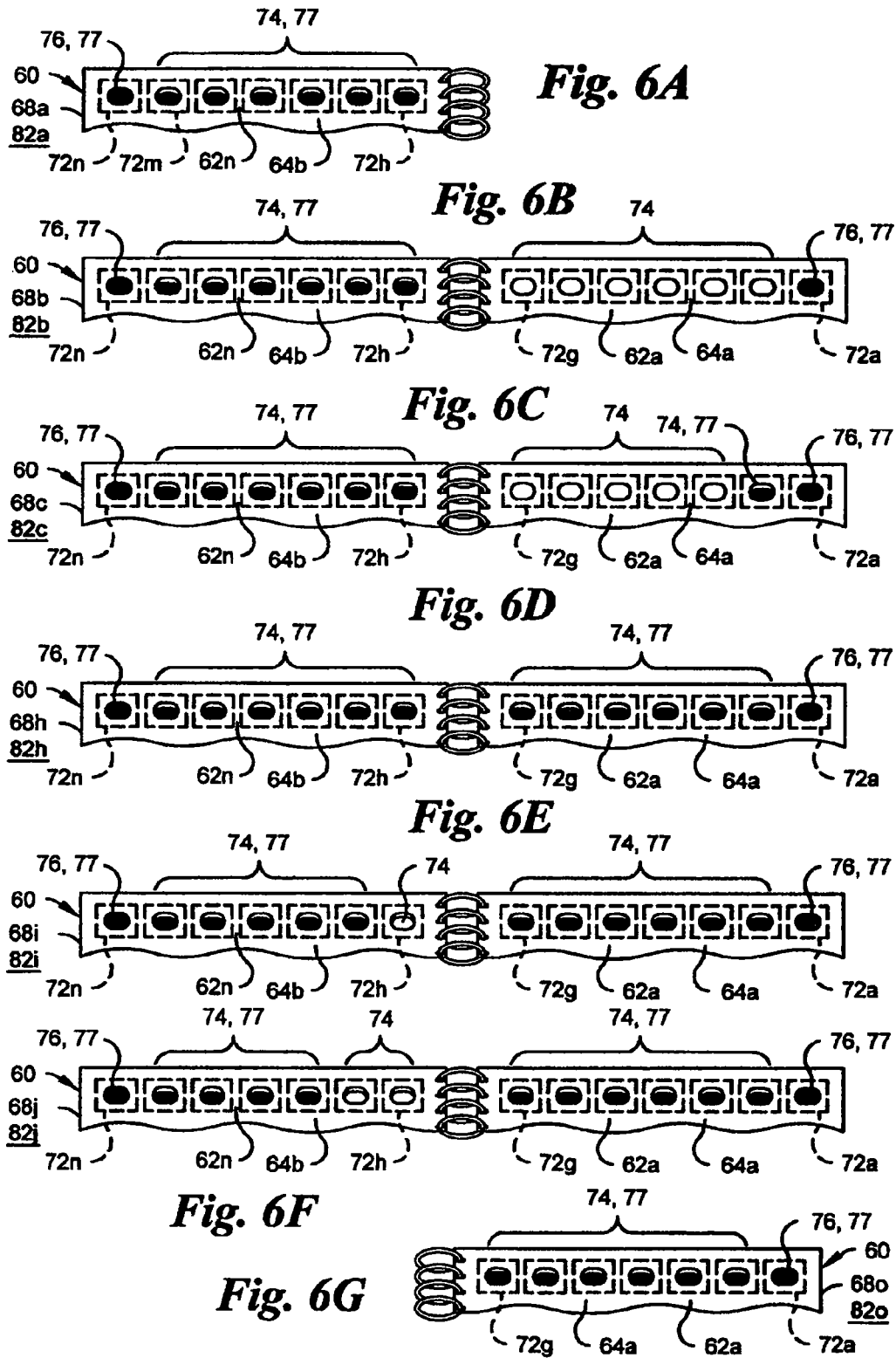

| PAGE SPREADS | CORRESPONDING PAGE IDENTIFIERS | OPEN-HOLE, CLOSED-HOLE STATUS OF HOLE LOCATIONS 72a THROUGH 72n AS SEEN BY DETECTORS 126a-126n | | | | | | | | | | | | | |
|---|---|---|---|---|---|---|---|---|---|---|---|---|---|---|---|
| | | 72a | 72b | 72c | 72d | 72e | 72f | 72g | 72h | 72i | 72j | 72k | 72l | 72m | 72n |
| 68a | 82a | O | O | O | O | O | O | O | C | C | C | C | C | C | C |
| 68b | 82b | C | O | O | O | O | O | O | C | C | C | C | C | C | C |
| 68c | 82c | C | C | O | O | O | O | C | C | C | C | C | C | C | C |
| 68d | 82d | C | C | C | O | O | C | C | C | C | C | C | C | C | C |
| 68e | 82e | C | C | C | C | O | C | C | C | C | C | C | C | C | C |
| 68f | 82f | C | C | C | C | C | C | C | C | C | C | C | C | C | C |
| 68g | 82g | C | C | C | C | C | C | C | C | C | C | C | C | C | C |
| 68h | 82h | C | C | C | C | C | C | C | C | C | C | C | C | C | C |
| 68i | 82i | C | C | C | C | C | C | C | C | C | C | C | C | C | C |
| 68j | 82j | C | C | C | C | C | C | C | C | O | O | C | C | C | C |
| 68k | 82k | C | C | C | C | C | C | C | O | O | O | O | C | C | C |
| 68l | 82l | C | C | C | O | C | C | O | O | O | O | O | O | C | C |
| 68m | 82m | C | O | O | C | C | C | C | C | C | C | C | C | C | C |
| 68n | 82n | C | O | O | C | C | C | C | C | C | C | C | O | C | C |
| 68o | 82o | C | O | O | C | C | C | C | C | C | C | C | C | O | C |
| 68x | 82x | C | C | C | C | C | C | C | C | C | C | C | C | C | C |
| 68y | 82y | C | C | C | C | C | C | C | C | C | C | C | C | C | C |
| 68z | 82z | C | C | C | C | C | C | C | C | C | C | C | C | C | C |

O = HOLE OPEN, DETECTOR VOLTAGE BELOW THRESHOLD
C = HOLE CLOSED, DETECTOR VOLTAGE ABOVE THRESHOLD

*Fig. 7*

INTERACTIVE ELECTRONIC DEVICE WITH OPTICAL PAGE IDENTIFICATION SYSTEM

CROSS-REFERENCE TO RELATED APPLICATIONS

This application is a continuation of pending U.S. patent application Ser. No. 12/141,552 filed Jun. 18, 2008, which is a division of U.S. patent application Ser. No. 10/767,321 filed Jan. 29, 2004, now abandoned and which is incorporated herein by reference and which claims the benefit of U.S. Provisional Patent Application No. 60/443,967, filed Jan. 31, 2003.

BACKGROUND OF THE INVENTION

The present invention relates to an optical page identification system for an interactive, electronic system using books. More particularly, the present invention relates to an autonomous, optical page-identification system that communicates to the system controller the identity of the page that is viewable by the user.

Certain interactive, electronic systems allow a child to activate electronic speech, sound and lights by pointing to words or images on the cover and pages of multi-page books used with a reader or base unit. The principle components of the typical system are the base unit housing system electronics, one or more books each removably mountable in the base unit, for an example in a book well, and a read only memory ("ROM"), either within the base unit or within cartridges removably connected with the base unit and storing software associated with the content of the books. In addition to book-based activity, letters of the alphabet, numerals or other graphics may be provided on the upwardly facing surface of the base unit to allow alphabet, number or graphics based learning or game play when a book is not present in the unit.

The conventional hardware for the implementing the aforementioned systems is generally not user friendly. A hardwired stylus or difficult to press pressure sensitive switches are provided to identify the page being viewed and to select the interactive content on the viewed page. This conventional hardware usually requires an undesirable amount of assistance, instruction and practice before a child can knowledgeably and properly use the system, particularly pre-school children. For example, to identify a currently viewable page or to detect a page turn, a child must be instructed to recognize and then touch on the page a uniquely positioned printed identification icon, such as a graphic having a particular geometric shape or an easily recognizable key word such as the word "Go". The systems are also error prone due to the positional certainty of the pages of the book on the reader. The systems are also prone to user induced errors such as failure to identify or properly select the page identification icon before interacting with a page or turning of multiple pages at once or the partial turning of a page. Accordingly, the current page identification and synchronization methods employed by conventional book interaction systems result in a large percentage of synchronization errors for young users.

An autonomous page identification system that communicates to the system controller the identity of the page that is viewable by the user without requiring user intervention provides a user friendly system. More particularly, an autonomous page identification system reducing or eliminating page synchronization errors will significantly increase the value of other, conventional aspects of such systems to users particularly pre-school users.

BRIEF SUMMARY OF THE INVENTION

In a first aspect, the invention is an electronic learning device for receiving a book having a plurality of successive page spreads, at least one page spread having selectable content and a page spread identifier, the device comprising: a housing with an upper surface configured to receive the book; a plurality of at least touch-responsive, mutually adjoining individual position sensors organized in a two-dimensional array in the housing beneath the upper surface; a plurality of individual optical sensors located in the housing beneath the upper surface so as to face the page spread identifier of the received book; a controller in the housing generating control signals identifying each individual position sensor and each individual optical sensor in a sequence for sequential activation of the individual position and optical sensors; and a driver circuit in the housing receiving the control signals from the microprocessor controller, the driver circuit being connected with each individual position sensor of the array and with each individual optical sensor of the plurality and being configured to respond to the control signals from the microprocessor controller to activate the individual position sensors of the array and the individual optical emitters in the sequence.

In a second aspect, the invention is an electronic learning device comprising a page having an optical identification code and selectable content; a housing is configured to support the page; an optical sensor located in the housing so as to irradiate and detect the optical identification code; a position sensor separate from the optical sensor and located in the housing so as to detect a location of content selected from the selectable content; a controller in the housing operatively connected directly with the optical sensor and with the position sensor and configured to sequence synchronize the irradiation and detection of the optical identification code with the detection of the location of the selected selectable content; and an audible output device controlled by the control electronics to produce an audible response associated with the selectable content in response to the page being supported by the housing and selectable content from the page being selected.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 4A through 4G are a series of top plan views of an upper portion of a book of the electronic learning system of FIG. 2, showing several of a plurality of page spread configurations of the book and also showing in particular closed-hole and open-hole locations forming page identifiers corresponding to each of the several page spread configurations;

FIG. 5 is a table summarizing the status of hole locations forming each of the plurality of page identifiers corresponding, respectively, to each of the plurality of page spread configurations of the book of the electronic learning system of FIG. 2;

FIGS. 6A through 6G are a series of bottom plan views of the portion of the book of FIGS. 4A through 4G, as seen by a plurality of emitter-detector pairs when the book is operatively installed in an electronic learning device of the electronic learning system of FIG. 2;

FIG. 7 is a table summarizing the status of hole locations forming each of the plurality of page identifiers as seen by the plurality of emitter-detector pairs when the book is operatively installed in the electronic learning device of FIG. 2;

DETAILED DESCRIPTION OF THE INVENTION

Figure 1:
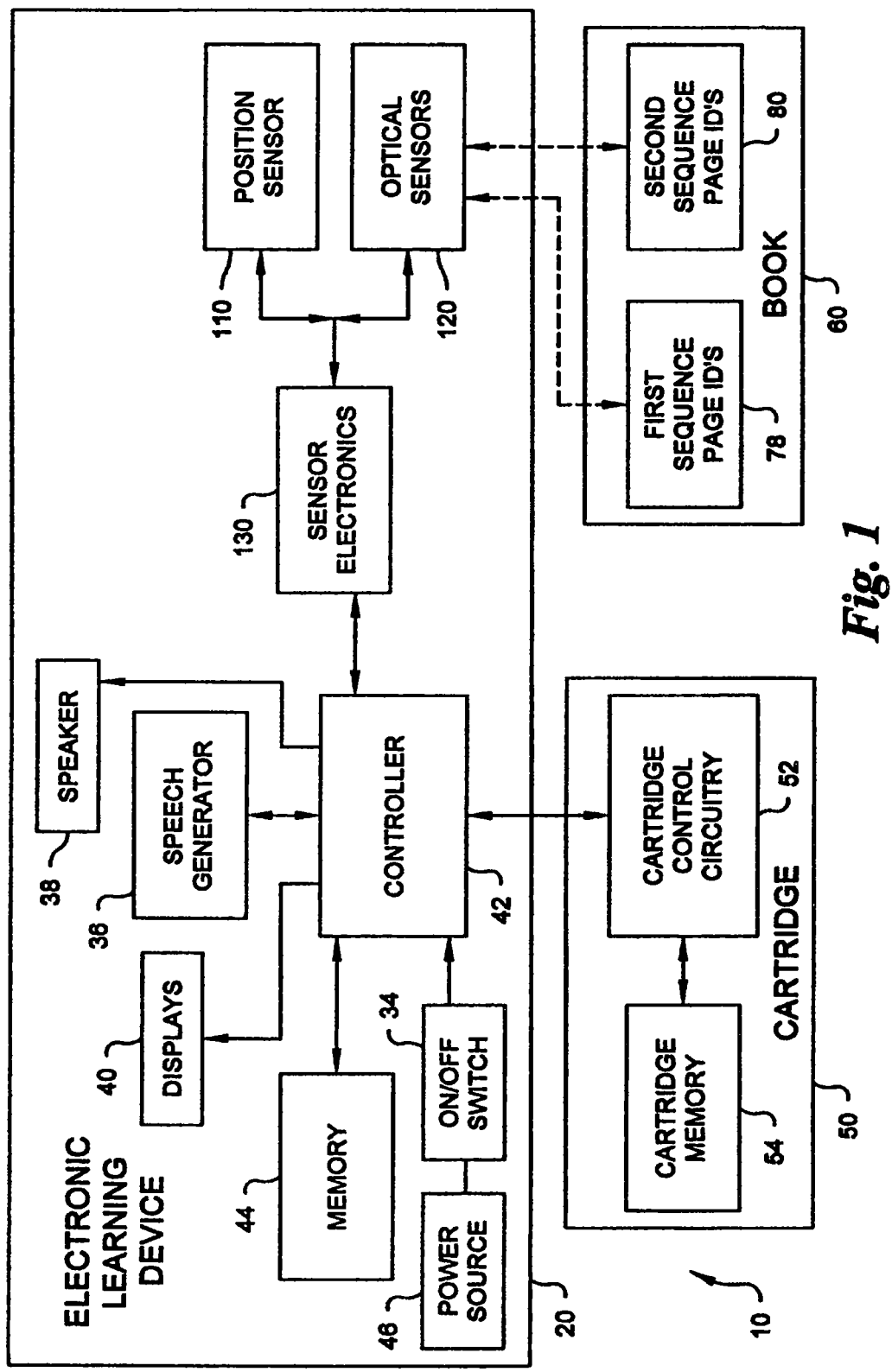
FIG. 1 is a schematic block diagram of an interactive electronic learning system having an autonomous page identification system in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of an interactive, electronic learning system having an optical page identification system in accordance with the present invention, and designated parts thereof. The terminology includes the words noted above, derivatives thereof and words of similar import.

Referring to FIGS. 1-10, there are shown an embodiment of the invention in the form of an interactive, electronic learning system, generally designated 10. The electronic learning system 10 includes an electronic learning device or base unit 20, and one or more books 60. Given the limitations of present consumer electronics, the system 10 may include one or more ROM cartridges 50, or other form mass electronic data storage, that can be removably connected with the base unit 20. The electronic learning device 20 also includes an integrated sensor system 100 (FIG. 8) having a position sensor 110 and, according to the present invention, an optical sensor system 120. With the exception of the integrated sensor system 100 disclosed in detail below, the electronic learning system 10 has substantially the same features as the electronic learning systems which are the subject of co-pending U.S. patent applications filed by the assignee of the present invention. The co-pending applications are U.S. patent application Ser. No. 10/448,581 (Pub. No. 2004-0076935 A1), "Method for Teaching Linguistics"; U.S. patent application Ser. No. 10/448,582 (issued on Apr. 10, 2007 as U.S. Pat. No. 7,203, 455 B2), "Interactive Multi-Sensory Reading System Electronic Teaching/Learning Device"; and U.S. patent application Ser. No. 10/448,583 (Pub. No. 2004-0043365 A1), "Electronic Learning Device for an Interactive Multi-Sensory Reading System", all having filing dates of May 30, 2003. The disclosures of these co-pending applications and that of Provisional Application No. 60/443,967 related hereto are hereby incorporated herein by reference.

Figure 2:
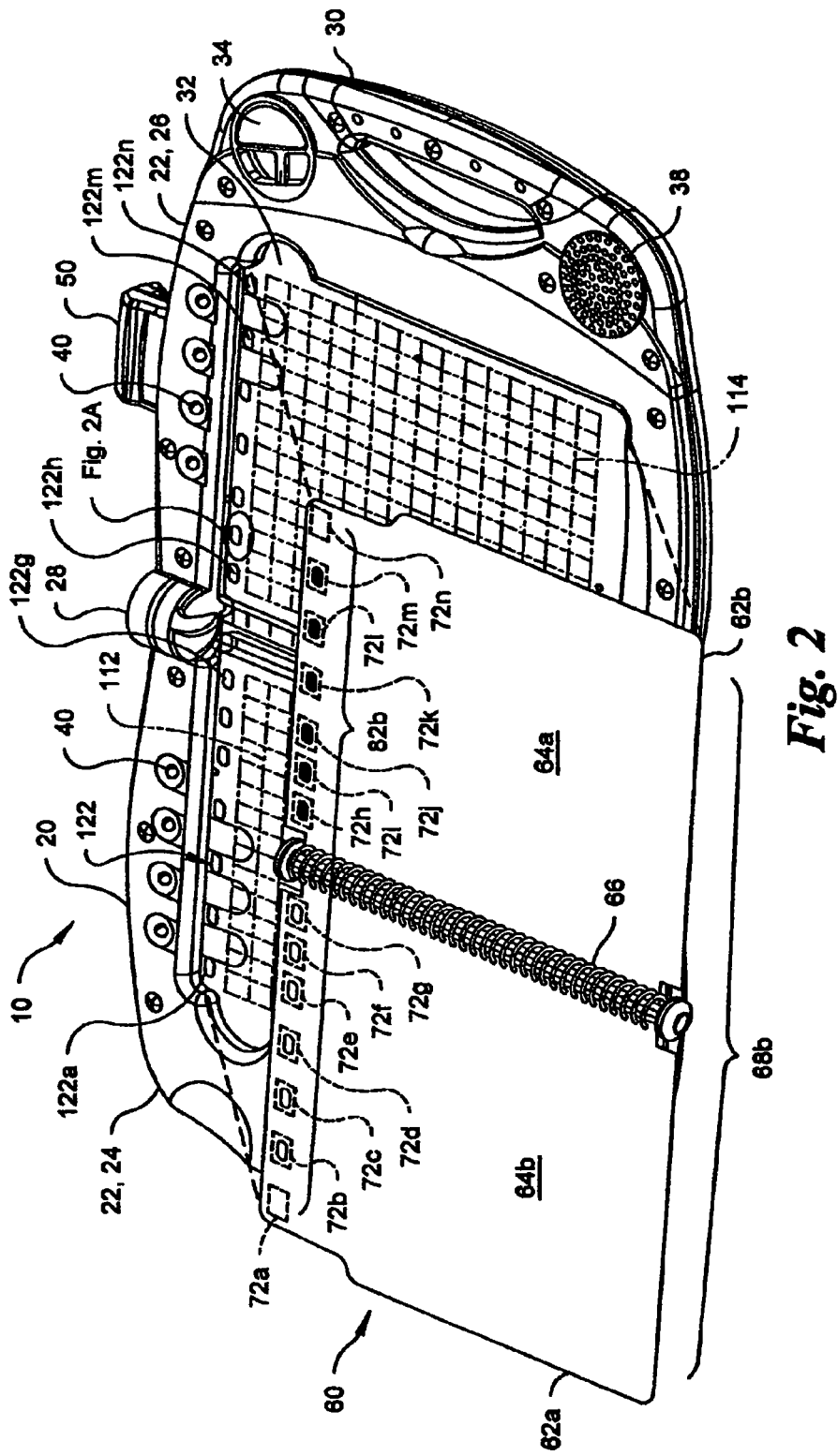
FIG. 2 is a top perspective view of the main components of the electronic learning system schematically illustrated in FIG. 1.

With reference now to FIGS. 1 and 2, the electronic learning system 10 includes the electronic learning device 20 for receiving the book 60 having a plurality of successive page spreads. As discussed below, at least one page spread of the book 60 has an optically readable page identifier. Additionally, at least one page of the book 60 has selectable content (not shown). The selectable content may be, for example, graphics disposed on the at least one page.

The electronic learning device 20 comprises a housing 22 configured to receive the book 60. The housing 22 includes a left hand portion 24 and a right hand portion 26. The two portions 24, 26 are hinged together by a hinge 28. A handle 30 is provided to allow the electronic learning device 20 to be conveniently transported when the left and right hand portions 24, 26 are placed in a closed position. Each portion 24, 26 includes a recess. The two recesses together form a book well 32 sized and shaped to releasably receive the book 60. The artisan will appreciated by that changes could be made to the configuration of the housing 22 without departing from the broad inventive concept of the invention. For example, the housing 22 can have a unitary construction without a hinge. Further the housing 22 can have a substantially planar surface for receiving a book instead of a book recess.

The electronic learning device 20 includes an on/off switch 34. The electronic learning device 20 includes a speech generator 36; a sound output device, such as a speaker 38; displays, such as light emitting diodes 40; and base unit memory 44, all operatively connected to a controller 42. The controller 42 may include a general-purpose microcontroller, such as SUNPLUS™ Part No. SPL130A, or the like. A power supply 46 provides power to the electronic components of the electronic learning device 20. Preferably, the power supply 46 is provided by dry-cell or rechargeable batteries stored within the housing 22.

Figure 8:
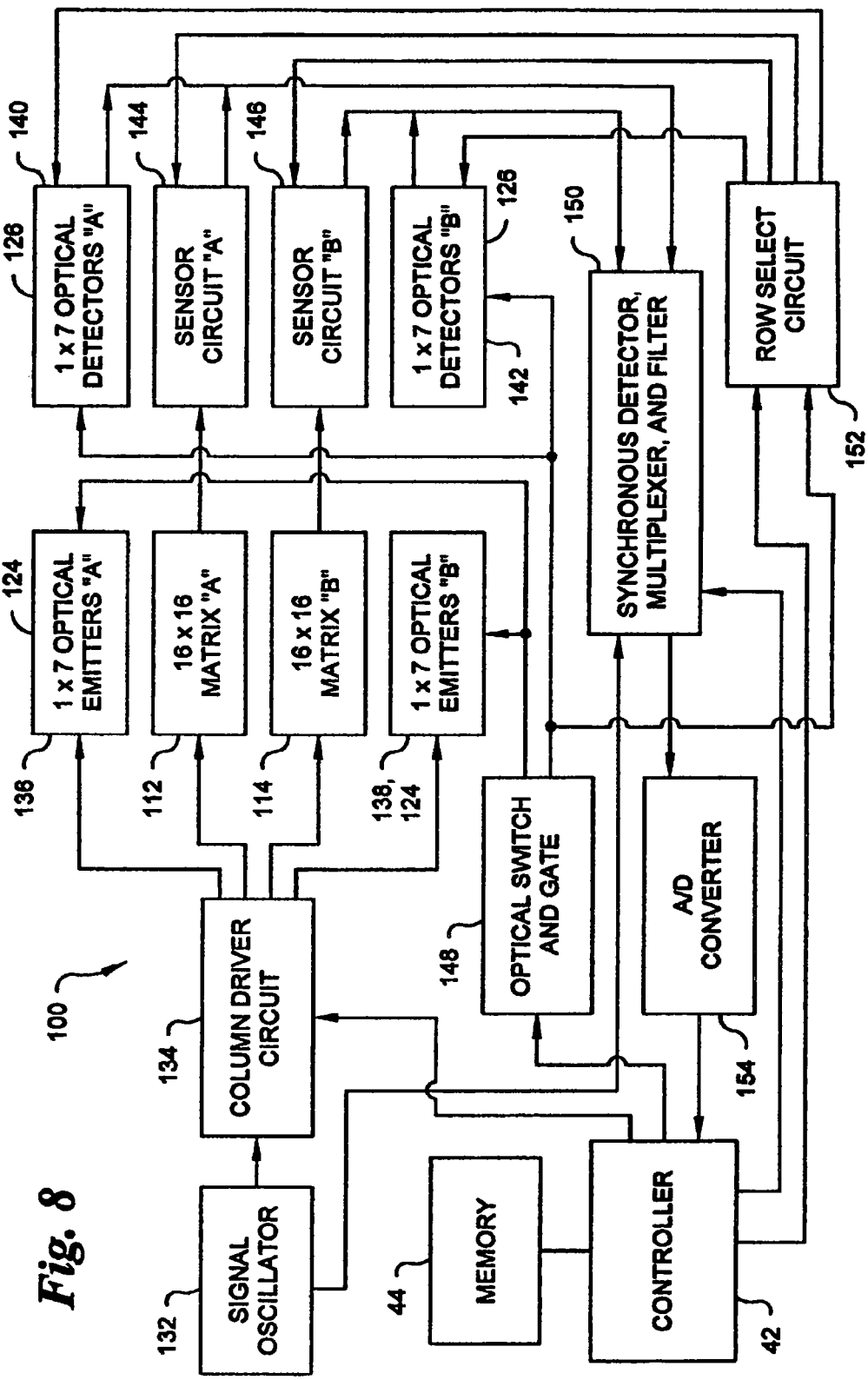
FIG. 8 is a block diagram of control electronics of the page identification system of FIG. 1.

Referring to FIGS. 1 and 8, the integrated sensor system 100 comprises a position sensor 110 and an optical sensor 120 operatively coupled to sensor electronics 130 controlled by the controller 42. In a preferred embodiment, the position sensor 110 comprise a plurality of at least touch-responsive, mutually adjoining, individual point location sensors organized in a two-dimensional array. The array is formed by separate and separated first and second sets of generally parallel, individual conductive lines transversely crossing over each other beneath an upper surface of the housing 22, each crossing point defining a "cross-point" sensor, in other word, one of the individual point location sensors. Further description of the array may be found in co-pending U.S. Pat. No. 7,203,455 B2. An oscillating signal generator 132 is cyclically coupled to individual conductive lines of the first set of conductive lines. A synchronous detection circuit 150 is operatively coupled with the oscillating signal generator 132 and with individual conductive lines of the second set to identify user selected individual point sensors (i.e. cross-points) of the first and second sets of lines of the array. In other embodiments of the invention, the position sensor 110 can be any position sensor suitable for use with an electronic learning device, such as those described in U.S. Pat. No. 5,686,705 and U.S. Pat. No. 6,661,405, and that is adaptable for operation with the optical sensor 120.

The two-dimensional array comprising the position sensor 110 preferably is partitioned into two smaller arrays, a left-hand sixteen by sixteen position sensor matrix 112 and a right-hand sixteen by sixteen position sensor matrix 114 (FIG. 8), respectively positioned in the corresponding left hand portion 24 and right hand portion 26 of the housing 22. Each position sensor matrix 112, 114 has row and column conductive lines, represented schematically in phantom in FIG. 2. The position sensor matrices 112, 114 are adapted to detect the proximity of a user's finger. Thus, the position sensor 110 is configured to determine the location of the selectable content on the at least one page spread when a user places a finger proximate selectable content overlaying the position sensor matrices 112, 114.

Figure 11:
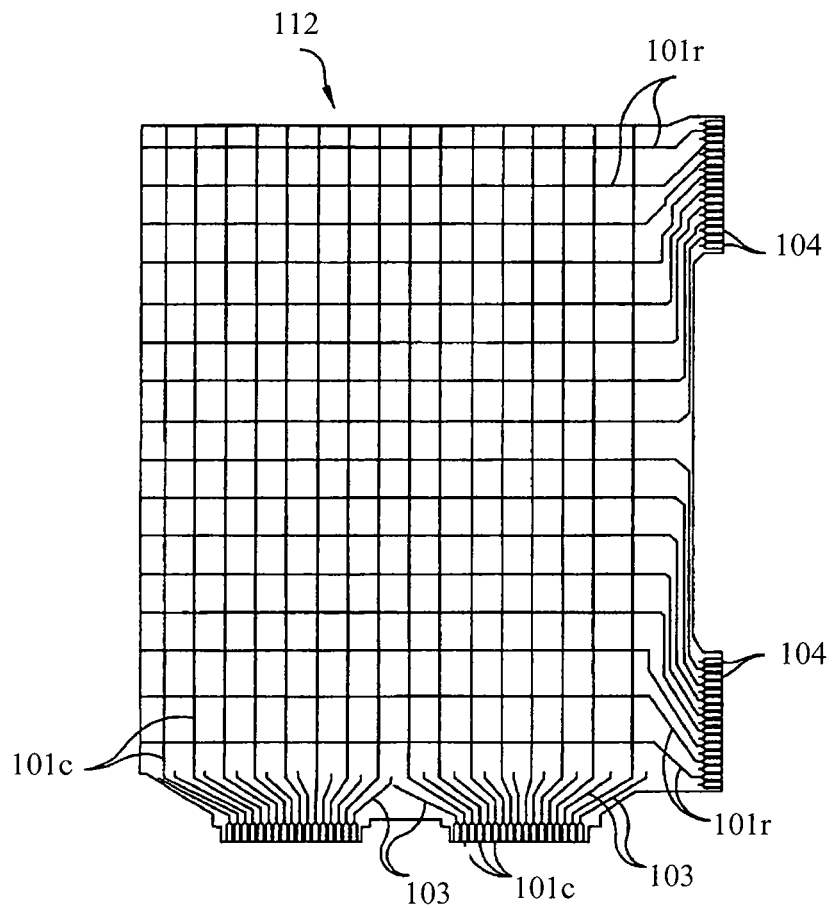
FIG. 11 is a plan view of a preferred embodiment of one of the sensor matrices comprising a preferred embodiment of the position sensor.

FIG. 11 shows one position sensor matrix 112 in accordance with an exemplary embodiment of the present invention. The other position sensor matrix 114 is suggestedly a mirror image but could be of a different configuration and construction. Each position sensor matrix 112, 114 suggestedly includes sixteen rows 101*r* and sixteen columns 101*c* of the conductive lines or traces. However, different numbers of either or both can be used. Each point where a row 101*r* and column 101*c* line cross creates a single individual "cross-point" sensor. It will be appreciated that this could also be referred to as point position sensor as each is located at a separate point in the array. Each of the sixteen by sixteen line arrays therefore create two hundred and fifty-six individual cross-point or point position sensors arranged in a rectangular array in the recesses of the left-hand portion 24 and right hand portion 26 of the housing 22.

Still referring to FIG. 11, the individual traces 101*r*, 101*c* are extended to side and bottom edges of an electrically insulative support sheet 102, for example a Mylar plastic sheet. Preferably, shorter conductive lines or traces 103 and 104 are extended from the side and bottom edges, respectively, of the sheet 102, one shorter trace 103 or 104 on either side of each sensor trace 101*r* or 101*c*, respectively. The shorter traces 103 and 104 are all connected to system ground through or with the conductive plane 105. The horizontal traces 104 extend inwardly from the vertical edge to just beyond where the row traces 101*r* widen out to form terminals and, with a uniform length, provide some impedance control. The vertical traces 103 extend from the bottom edge up to a point where the vertical traces 101*c* begin to run parallel, just below where those traces are flared and to within about one-half inch (12 mm) of the lowest cross-points. Traces 103 prevent cross coupling between the column traces 101*c* when the columns are being driven by an oscillating signal generator 132.

Figure 12:
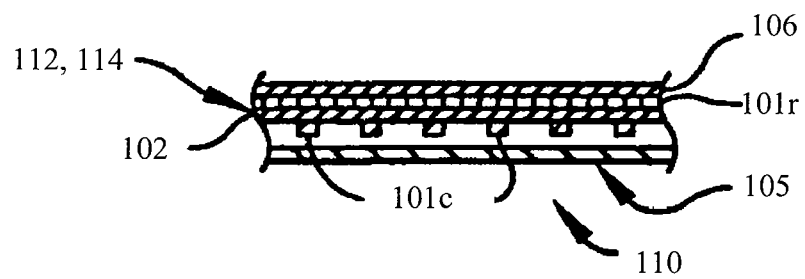
FIG. 12 is a cross-section view of a portion of a preferred embodiment of a sensor matrix of the position sensor.
Figure 13:
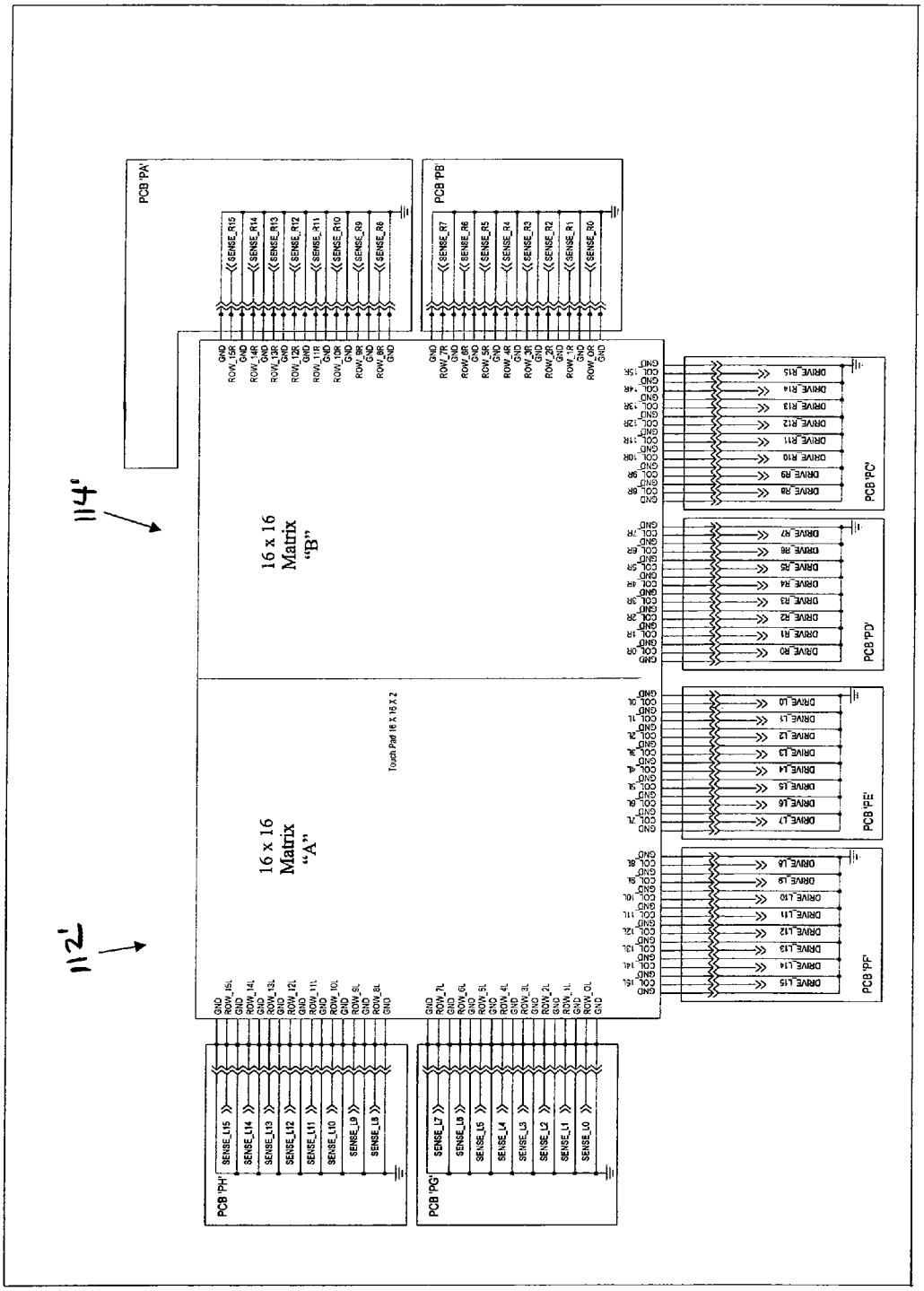
FIG. 13 is a diagrammatic plan view showing the identification of individual row and column traces $101r$, $101c$ to explain sequence synchronized operation of the position sensor.

FIG. 12 shows an example of the cross-sections of the position sensor and depicts a plastic spacer 106, a plurality of the spaced apart column (vertical) traces 101*c*, the non-conductive (e.g. Mylar) sheet 102 and one of the spaced apart row (horizontal) traces 101*r* transverse to the plurality of column traces 101*c*. The non-conductive sheet 102 supports and separates the column traces 101*c* from the row traces 101*r* and forms with those traces arrays 112, 114. The sensor preferably includes a conductive plane 105 in the form of a metal plate, connected to system ground and parallel to and spaced away from the arrays 112, 114. FIG. 13 identifies individual column and row traces 101*c*, 101*r* depicted in FIG. 11 for both sensor matrices 112, 114 of the position sensor 110, and their connections with the sensor electronics 130 of FIG. 1 as will be explained.

Figure 2A:
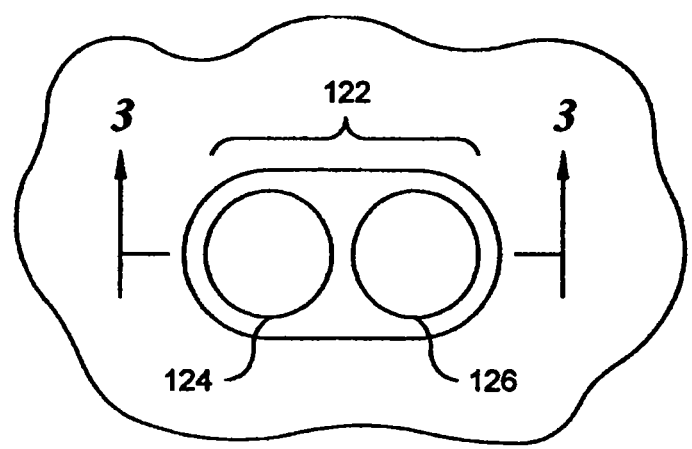
FIG. 2A is an enlarged top plan view of an emitter-detector pair of the page identification system of the electronic learning system of FIG. 2.
Figure 3:
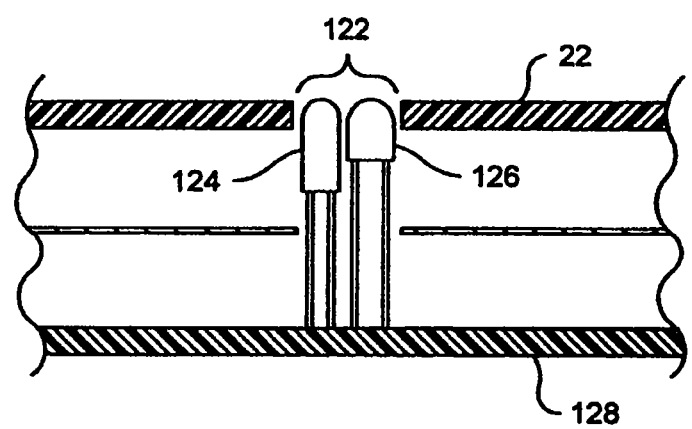
FIG. 3 is a cross-section view of the emitter-detector pair of FIG. 2A, taken along line 3-3.

With reference back to FIGS. 1-3, the optical sensor system 120 comprises an array of preferably identical optical emitter and optical detector pairs, one pair being indicated collectively at 122 in FIG. 2A. Seven individual pairs 122*a*-122*g* are arrayed in the left hand portion 24 and seven more 122*h*-122*n* are arrayed in the right-hand portion 26. Preferably, the emitter-detector pairs 122 are mounted upwardly facing in the upper margin of the left portion 24 and right portion 26 of the book well 32. As shown in FIG. 3, each is connected with a circuit board 128 included as part of the control electronics in the housing 22. Preferably, but not necessarily, the optical emitters 124 and optical detectors 126 operate in the infra red (IR) portion of the electromagnetic spectrum. However, the emitter-detector pairs 122 could operate at other wavelengths without departing from the scope of the invention.

In the preferred embodiment shown in FIG. 2, a total of fourteen optical emitter-detector pairs 122 are provided and, the number of optical emitter-detector pairs 122 may be more or less than fourteen and is determined by the number of hole locations encoding the page identifiers in the book 60 as will be described. The spacing between the optical emitter-detector pairs 122 may be uniform or non-uniform provided that they are positioned to be in registry with corresponding hole locations in each book 60. Accordingly, the fourteen optical emitter-detector pairs 122 are positioned in FIG. 2 at locations corresponding to fourteen potential hole locations 72*a* through 72*n* in each book 60 in use, as will be described further with respect to FIGS. 4A-7, such that each optical emitter-detector pair 122*a* through 122*n* has within its field of view the hole location 72*a* through 72*n* with which it corresponds.

With reference now to FIGS. 1 and 8, the sensor electronics 130 are operatively coupled to the optical emitter detector pairs 122 of the optical sensor system 120, to the position sensor matrices 112, 114 and individual cross-point or point position sensors of the position sensor 110 and to the controller 42. As will be discussed in further detail below, the sensor electronics 130, in conjunction with the controller 42 and memory 44, form a set of control electronics configured to synchronize operation of the position sensor 110 with the optical sensor system 120 and the operation of individual sensors of each. The sensor electronics 130 include the oscillating signal generator 132, a column driver circuit 134, a first sensor circuit 144 operatively coupled with the left-hand position sensor matrix 112 and a second sensor circuit 146 operatively coupled with the right-hand position sensor matrix 114.

The sensor electronics 130 further include first and second optical emitter circuits 136, 138, respectively, each operatively coupled to seven optical emitters 124a-124g and 124h-124n; first and second optical detector circuits 140, 142, respectively, each operatively coupled to seven optical detectors 126a-126g and 126h-126n; a row select circuit 152; a synchronous detector with multiplexer and filter 150; an optical switch and gate 148; and an analog to digital (A/D) signal converter 154. A slightly simpler version is shown in block diagram form in FIG. 14 that omits the optical switch and gate of FIG. 8.

The electronic learning system 10 further preferably comprises cartridge 50. In a preferred embodiment, the cartridge 50 is operatively coupled to the controller 42 by removably inserting the cartridge 50 into the electronic learning device 20. The cartridge 50 is preferably uniquely associated with the book 60. A plurality of cartridge 50 and book 60 sets may be provided. The cartridge 50 has memory 54 operatively connected to cartridge control circuitry 52. Alternatively, the cartridge 50 could provide only memory 54. Stored in the cartridge memory 54 is software and/or data associated with the content of the book 60.

Turning now to FIGS. 2 and 4A-7, each book 60 is encoded for optical page identification by the sensors 122. The book 60 comprises a plurality of pages and a plurality of successive page spreads defined by the pages. Each page spread is defined either by one side of a page (i.e. outer cover of a closed book) or by both a second (left or even numbered) side of a first page and a first (right or odd numbered) side of a second page. In this illustration, the book 60 comprises fourteen pages and fifteen page spreads but may have more or less than fourteen pages and corresponding page spreads without departing from the scope and spirit of the invention. The plurality of pages is preferably connected by a spine 66 or any other well known binding.

FIGS. 4A-4G depict various page spreads from an exemplary fourteen page book 60. Each of the fourteen pages is identified by reference numerals 62: 62a-62n. Each of the two sides of each page is represented by numerals 64: 64a for the first side (odd numbered page) and 64b for the second side (even numbered page). Page spreads are identified by reference numerals 68: 68a-68o for the fifteen spreads by fourteen pages. FIGS. 4A-4G represent various page spreads as the spreads are seen by the user, that is top plan views of the book 60 and the spreads 122.

With reference to FIG. 4A, in the preferred embodiment of the book 60, a first page spread 68a is formed by a first side 64a of a first page 62a. This is a closed book lying on its rear cover. With reference to FIGS. 2 and 4B, a second page spread 68b is formed by a second side 64b of the first page 62a and a first side 64a of a second page 62b. With reference to FIGS. 4C-4G, a third page spread 68c is formed by the second side 64b of the second page 62b and the first side 64a of a third page 62c (FIG. 4C); an eighth page spread 68h is formed by the second side 64b of the seventh page 62g and the first side 64a of an eighth page 62h (FIG. 4D); a ninth page spread 68i is formed by the second side 64b of the eighth page 62h and the first side 64a of a ninth page 62i (FIG. 4E); a tenth page spread 68j is formed by the second side 64b of the ninth page 62i and the first side 64a of a tenth page 62j (FIG. 4F); and a fifteenth page spread 68o is formed by the second side 64b of a fourteenth page 62n (FIG. 4G). Fourth through seventh and eleventh through fourteenth page spreads of the book 60 are not illustrated, but are page spreads formed by the second (or left) side and the first (or right) side, respectively, of corresponding pages similar to the page spreads 68b-68c and 68h-68j shown in FIGS. 4B-4F.

The book 60 further comprises a plurality of page identifiers 82a-82o which are integral in the book 60. Each page identifier is uniquely associated with a corresponding page spread. Each page spread is uniquely encoded so as to be readable by an optical sensor system beneath the book 60. The spreads are encoded by the provision or absence of holes at predetermined location in the spreads, which overlie individual sensors of a sensor system under the book 60. Each page identifier comprises a series of overlayable arrangements of open or closed potential hole locations (hereinafter simply "hole locations"). In a preferred embodiment, the hole locations are positioned within an upper margin of each page to physically lie over the sensors 122a-122o. Alternatively, the hole locations may be positioned within other portions of each page and the sensors repositioned accordingly. As will become apparent form the discussion below, the number of hole locations required for page identifier encoding is dependent on the number of page spreads to be identified and in the preferred encoding scheme is less than half the number of page spreads.

In the illustrated embodiment, book 60 has fifteen page spreads, identified by reference numerals, collectively by 82 and 82a-82o for individual spreads. Each page is provided with seven hole locations. The first page spread 68a and the fifteenth page spread 68o correspond to the closed book 60 lying on its back cover and its front cover, respectively, and thus are formed by a single page each having seven hole locations. The page spreads between the first page spread 68a and the fifteenth page spread 68o are two-page spreads and therefore have fourteen hole locations indicated by reference numerals, collectively by 72 and individually at 72a through 72n (FIG. 2).

Each hole location is either an open-hole location 74, or a closed-hole location 76. Optionally, one or more of the closed-hole locations 76 may have a foil 77 with an optical reflectance detectably different than the optical reflectance of an area adjacent the closed-hole location.

Again, FIGS. 4A-4G depict top plan views of some of the spreads as seen by the user rather than the sensor. A first page identifier 82a corresponds to the first page spread 68a (FIG. 4A). The first page identifier 82a is an encoding formed by seven of fourteen possible hole locations (eighth through fourteenth hole locations, 72h though 72n, in the first side 64a of the first page 62a), which are closed. A closed location will reflect light from the emitter 124 of each sensor 122 so as to be detected by the detector 126 of each sensor pair 124/126. A hole or no page over the sensor will not reflect light and will not register on the sensor 122. As will be discussed shortly, various hole locations 72a-72o are eventually closed or covered. Preferably a metallic foil 77 is used to close a hole location facing open holes in pages 68 adjoining and facing the closed hole to better reflect light from a facing emitter 124 and raise the signal level from the detector 126 sensing the closed hole/foil. The eighth through thirteenth hole locations 72h through 72m are locations of one or more open-holes 74. These overlying foils 77 (represented by a darkened hole location) disposed on closed-hole locations 76 that are located on successive pages beneath the topmost first page 62a. As will be discussed, these open hole 74 and closed hole 77 locations are in accordance with the scheme in FIG. 5, as further discussed below. The fourteenth hole location 72n is a closed-hole 76 covered by a foil 77.

To summarize FIG. 4A, a user looking down at a closed book 60 on the right-hand side 26 of the device 20 is presented with seven potential hole locations 72h through 72n. The user sees a foil 77 in each location with a series of open holes overlying each foil 77 that decrease in number from left to right (72h to 72n) across the book 60. As will be discussed below, this arrangement occurs because each of the first seven pages 62a-62g has one foil 77 closed hole and one less open hole 76 than the page above it (i.e. previous page).

The encoding for the first page identifier 82a (FIG. 4A) is best understood in conjunction with the hole location status tabulation of FIG. 5 in which open-hole locations 74 are indicated by the letter "O", closed-hole locations 76 without a foil 77 are indicated by the letter "C", and closed-hole locations 76 with a foil 77 are indicated by the letter "F". (It should be understood that on some other page underlying each open hole location 74 is a foil 77.) For example, the hole location status tabulation in FIG. 5 shows that a foil 77 is present at the eighth hole location 72h of the first page spread 68a on the underlying seventh page 68g. The foil 77 is visible in a top plan view of the book 60 in page spread 68a because an open hole is provided at the eighth hole location 72h in each of the first through sixth pages (68a through 68f) overlying the seventh page 68g. Thus, as stated above, the first page (or front cover) 62a of the book 60 comprises six open-hole locations 74 (for eighth through thirteenth hole locations, 72h through 72m) below each of which is a foil 77 at a successive closed hole location 76 on the successive corresponding underlying pages. The first page 62a further has only one closed-hole location 76 with a foil 77 in the fourteenth hole location 72n.

Referring to FIG. 4B and FIG. 5, a second page identifier 82b corresponds to the second page spread 68b. The second page spread 68b is a two-page spread. Accordingly, the second page identifier 82b is encoded by fourteen hole locations. The first through seventh hole locations, 72a through 72g, are located in the upper margin of the second side 64b of the first page 62a. These hole locations are in mirror image registry with the hole locations, 72h through 72n, on the first side 64a of the first page 62a (FIG. 4A), and have in reverse order the same open-hole and closed-hole encoding as the first side 64a of the first page 62a. The only difference is that the first closed-hole location 72a of the second page identifier 82b does not have a foil 77 as does the corresponding fourteenth closed-hole location 72n on the first side 64a of the first page 62a. This is a result of the method of fabrication of the book 60. A foil 77 could have been visibly mounted in the first hole location 72a of the second spread 68b. Indeed, any and every closed (C) location in FIG. 5 could be a foil (F) location and vice versa. The eighth through fourteenth hole locations, 72h though 72n, are located in the upper margin of the first side 64a of the second page 62b. The eighth through twelfth hole locations, 72h through 72l, are open-hole locations 74 in that page 62b. The thirteenth and fourteenth hole locations 72m, 72n are closed-hole locations 76. The thirteenth hole location 72m has a foil 77. The portion of the encoding for the second page identifier 82b on the first side 62a of the second page 62b has one less open-hole location 74 than the encoding for the first page identifier 82a on the first side 64a of the first page 62a.

Referring to FIG. 4C and FIG. 5, a third page identifier 82c corresponds to the third page spread 68c. The third page spread 68c also is a two-page spread. Accordingly, the third page identifier 82c is encoded by fourteen hole locations. The first through seventh hole locations, 72a through 72g, are located in the upper margin of the second side 64b of the second page 62b, are in mirror image registry with the hole locations 72h though 72, on the first side 64a of the second page 62b, and have, in reverse order, the same open-hole and closed-hole encoding as the first side 64a of the second page 62b. The closed-hole location 72b of the third page identifier 82c does not have a foil 77. The eighth through fourteenth hole locations, 72h though 72n, are located in the upper margin of the first side 64a of the third page 62c. The eighth through eleventh hole locations, 72h through 72k, are open-hole locations 74 in the page 62c. The twelfth, thirteenth and fourteenth hole locations 72l, 72m, 72n are closed-hole locations 76 in the page 62c. The twelfth hole location 72l has a foil 77. The portion of the encoding for the third page identifier 82c on the first side 64a of the third page 62c has one less open-hole location than the encoding for the second page identifier 82a on the first side 64a of the second page 62b.

For brevity, the fourth through seventh page spreads for the book 60 are not shown, as those skilled in the art will understand from the encoding of the fourth through seventh page identifiers, 82d through 82g, shown in FIG. 5, that the encoding for each successive page identifier decreases in a total number of open-hole locations by at least one open-hole location and that the location of the foil shifts inwardly one hole position for each page 68d-68g.

Referring to FIG. 4D and FIG. 5, an eighth page identifier 82h corresponds to the eighth page spread 68h. The eighth page spread 68h is a two-page spread having the eighth page spread identifier 82h encoded by fourteen hole locations, each of which is a closed-hole location 76. Those skilled in the art will understand that the eighth page spread 68h is a separator page that partitions the encoding scheme of the present invention into a first sequence of page identifiers comprising an overlayable arrangement of open-hole and closed-hole locations in which each successive arrangement of the first sequence decreases in a first total number of open-hole locations by at least one open-hole location, as discussed above, and a second sequence of page identifiers comprising overlayable arrangements of open-hole and closed-hole locations in which each successive arrangement of the second sequence increases in a second total number of open-hole locations by at least one open-hole location, as discussed below.

Referring to FIG. 4E and FIG. 5, a ninth page identifier 82i corresponds to the ninth page spread 68i. The ninth page spread 68i is a two-page spread. Accordingly, the ninth page identifier 82i is encoded by fourteen hole locations. The first through seventh hole locations, 72a through 72g, are located in the upper margin of the second side 64b of the eighth page 62h, are in mirror image registry with the hole locations, 72h though 72n, on the first side 64a of the eighth page 62h, and are all closed-hole locations 76. The seventh hole location 72g is a closed-hole location 76 with a foil 77. The eighth through fourteenth hole locations, 72h though 72n, are located in the upper margin of the first side 64a of the ninth page 62i. The eighth hole location 72h is an open-hole location 74. The ninth through fourteenth hole locations, 72i through 72n, are closed-hole locations 76. The portion of the encoding for the ninth page identifier 82i on the first side 62a of the ninth page 62i has one more open-hole location 74 (at 72h) than does the encoding for the eighth page identifier 82h on the first side 64a of the eighth page 62h (FIG. 4D).

Referring to FIG. 4F and FIG. 5, a tenth page identifier 82j corresponds to the tenth page spread 68j. The tenth page spread 68j also is a two-page spread. Accordingly, the tenth page identifier 82j is encoded by fourteen hole locations. The first through seventh hole locations, 72a through 72g, are located in the upper margin of the second side 64b of the ninth page 62i, are in mirror image registry with the hole locations, 72a though 72g, on the first side 64a of the ninth page 62i (FIG. 4E), and have in reverse order the same open-hole and closed-hole encoding as the first side 64a of the ninth page 62i. The sixth hole location 72f of the tenth page identifier 82j is a closed hole-location 76 with a foil 77. The eighth through fourteenth hole locations, 72h though 72n, are located in the upper margin of the first side 64*a* of the tenth page 62*j*. The eighth and ninth hole location 72*h*, 72*i* are open-hole locations 74. The tenth through fourteenth hole locations, 72*j* through 72*n*, are closed-hole locations 76. The portion of the encoding for the tenth page identifier 82*j* on the first side 62*a* of the tenth page 62*j* has one more open-hole location 74 than the encoding for the ninth page identifier 82*i* on the first side 64*a* of the ninth page 62*i* (FIG. 4E).

For brevity, the eleventh through thirteenth page spreads for the book 60 are not shown, as those skilled in the art will understand from the encoding of the eighth through tenth page identifiers, 82*h* through 82*j*, shown in FIG. 5, that the encoding for each successive page identifier increases in a total number of open-hole locations by at least one open-hole location. Also for brevity, the fifteenth page identifier 82*o* (FIG. 4G) corresponding to the fifteenth page spread 68*o* has in reverse order substantially the same encoding as the first page identifier 82*a* and is not further discussed.

With reference again to FIG. 5, the preferred embodiment of the book 60 comprises a first (or front cover) page spread 68*a* formed by the first side 64*a* of the first page 62*a*, a fifteenth (or back cover) page spread 68*o* formed by the second side 64*b* of the fourteenth page 62*n*, and a plurality of successive page spreads 68*b*-68*n* therebetween. Preferably, the plurality of page spreads 68*b*-68*n* are formed by a first (right or odd numbered) side of a first corresponding page and a second (left or even numbered) side 64*b* of a second corresponding page, such as the first side 64*a* of the second page 62*b* and the second side 64*b* of the first page 62*a* forming the second page spread 68*b* shown in FIG. 2.

Stated another way, the book 60 additionally comprises a first sequence 78 of page identifiers 82*b*-82*h* (see FIG. 5). Each page identifier 82*b*-82*h* is associated with a first corresponding page spread 68*b*-68*h* of the plurality of successive page spreads. The first sequence 78 comprises overlayable arrangements of open-hole and closed-hole locations 74(O), 76(F/C), respectively. Each successive arrangement of the first sequence 78 decreases in a first total number of open-hole locations by at least one open-hole location 74. For example, as shown in FIG. 5, for the encoding of the first sequence 78 of page identifiers 82*b*-82*h* for a fourteen-page book, the first total number of open-hole locations 74 decreases by two open-hole locations 74 for successive arrangements corresponding to the page identifiers 82*b*-82*g* associated with the second through seventh page spreads 68*b*-68*g* and by one open-hole location 74 for the succession from the seventh page spread 68*g* to the eighth page spread 68*h*.

Those skilled in the art will understand from the encoding scheme shown in FIG. 5 that each arrangement of the first sequence of page identifiers has at least one closed-hole location on the first side 64*a* of the first corresponding page of the first corresponding page spread. The at least one closed-hole location has a first optical reflectance detectably different than a second optical reflectance of a first area adjacent the at least one closed-hole location when provided with a foil 77 in the hole location.

The book 60 additionally comprises a second sequence 80 of page identifiers 82*h*-82*n*. Each page identifier 82*h*-82*n* is associated with a second corresponding page spread 68*h*-68*n* of the plurality of successive page spreads. The second sequence 80 comprises overlayable arrangements of open-hole and closed-hole locations 74, 76, respectively. Each successive arrangement of the second sequence 80 increases in a second total number of open-hole locations by at least one open-hole location 74. For example, as shown in FIG. 5, for the encoding of the second sequence 80 of page identifiers 82*h*-82*n* for a fourteen-page book, the second total number of open-hole locations 74 increases by one open-hole location 74 for the succession from the eighth page spread 68*h* to the ninth page spread 68*i* and by two open-hole locations 74 for successive arrangements corresponding to the page identifiers 82*i*-82*n* associated with the ninth through fourteenth page spreads 68*i*-68*n*.

Those skilled in the art will understand from the encoding scheme shown in FIGS. 4A-5 that each arrangement of the second sequence 80 of page identifiers has at least one closed-hole location on the second side 64*b* of the second corresponding page of the second corresponding page spread. The at least one closed-hole location has a third optical reflectance detectably different than a fourth optical reflectance of a second area adjacent the at least one closed-hole location. The artisan also will understand from the discussion above that the difference in optical reflectance detectability can by achieved by positioning of the foil 77 or other reflective material at the corresponding one closed-hole location (72*g*-72*a* in sequence 80). Accordingly, the first and third optical reflectances can be substantially the same. Similarly, the second and fourth optical reflectances can be substantially the same without departing from the spirit and scope of the invention. Still further, the artisan will understand from the discussion below that the materials or surface treatments provided at the closed-hole locations and in the adjacent areas can be any combination of materials or surface treatments having the optical reflectance properties required to obtain a desired signal to noise ratio for the optical sensors, also discussed below.

In use, the electronic learning device 20 is activated using the on/off switch 34, the cartridge 50 is coupled to the electronic learning device 20, the book 60 is placed in the book well 32. The integrated sensor system 100 operates as subsequently described.

Referring to FIG. 8, the oscillating signal generator 132 generates a square wave signal having a frequency of approximately 250 kHz at 3.3 V to the column driver circuit 134. Corresponding pairs of the vertical column conducting lines of the position sensor matrices 112, 114 are excited sequentially from one through sixteen with the square wave signal. The horizontal row conducting lines of each of the matrices 112, 114 are scanned sequentially from one through sixteen during each excitation of one vertical column line. In this manner, each cross-point of the sensor matrices 112, 114 is measured individually. The row select circuit 152 directs the sequential sensing of the sensor circuits 144, 146. The sensor circuits 144, 146 detect signals on the row lines of the sensor matrices 112, 114 and forward the detected signals to the synchronous detector, multiplexer and filter 150. Thereafter, the detected signals are converted to digital signals by the A/D converter 154 and forwarded to the controller 42 for analysis.

The measured values of each cross-point are stored in a memory 44 operatively coupled to the controller 42. When a finger or hand is present over the sensor matrices 112, 114, the value of signals received by the sensor circuits 144, 146 is reduced at the location of the finger or hand over individual cross-points. By comparing successive full scans of the sensor matrices 112, 114 for the presence of a finger, the precise location of the finger can be determined.

Figure 14:
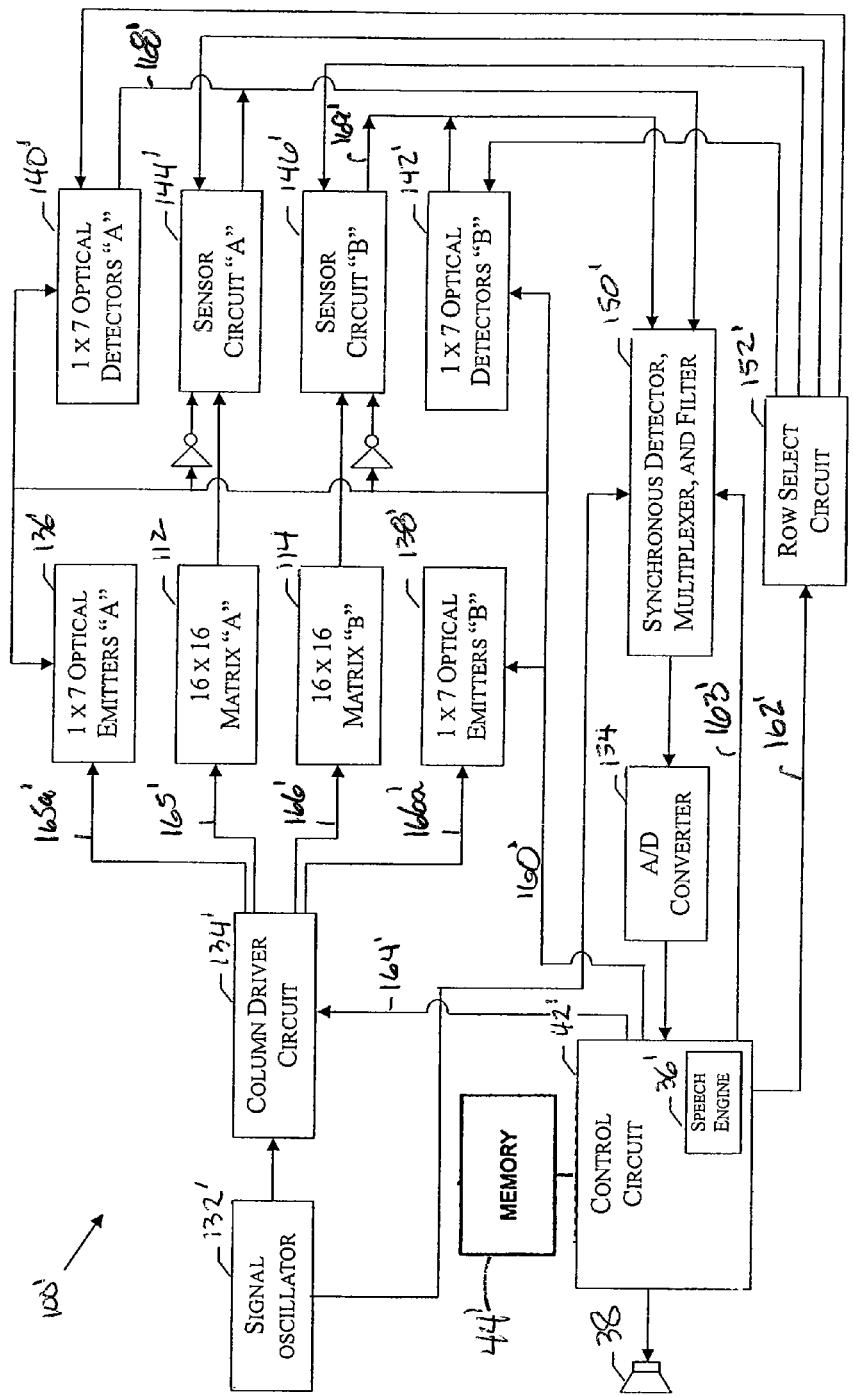
FIG. 14 is a block diagram of an alternate control electronics of the page identification system of FIG. 1.

This description applies to the operation of the circuit in FIG. 14 as well. The circuit embodiment of FIG. 14 is very similar to that of FIG. 8 and functions in a similar manner to the extent it has been described thus far. The individual circuit components of FIG. 14 are identical or very similar to those in FIG. 8 and bear similar reference numbers. Control and synchronization of the operation of the optical emitter and detector circuits 136', 138', 140' and 142' with the scanning circuits 144', 146' for the sensor matrices 112', 114' are accomplished in this embodiment under direct control of controller 42', which activates and deactivates the optical sensors and enables and disables the row select circuit 152' to allow isolation and independent control of the optical emitter and detector circuits 136', 138', 140' and 142' from the row select circuit 152' and matrices 112',114'. Again, the optical emitter and detector circuits 136', 138', 140' and 142' are preferably activated after each full scan of the sensor matrices 112' and 114'.

Figure 15:
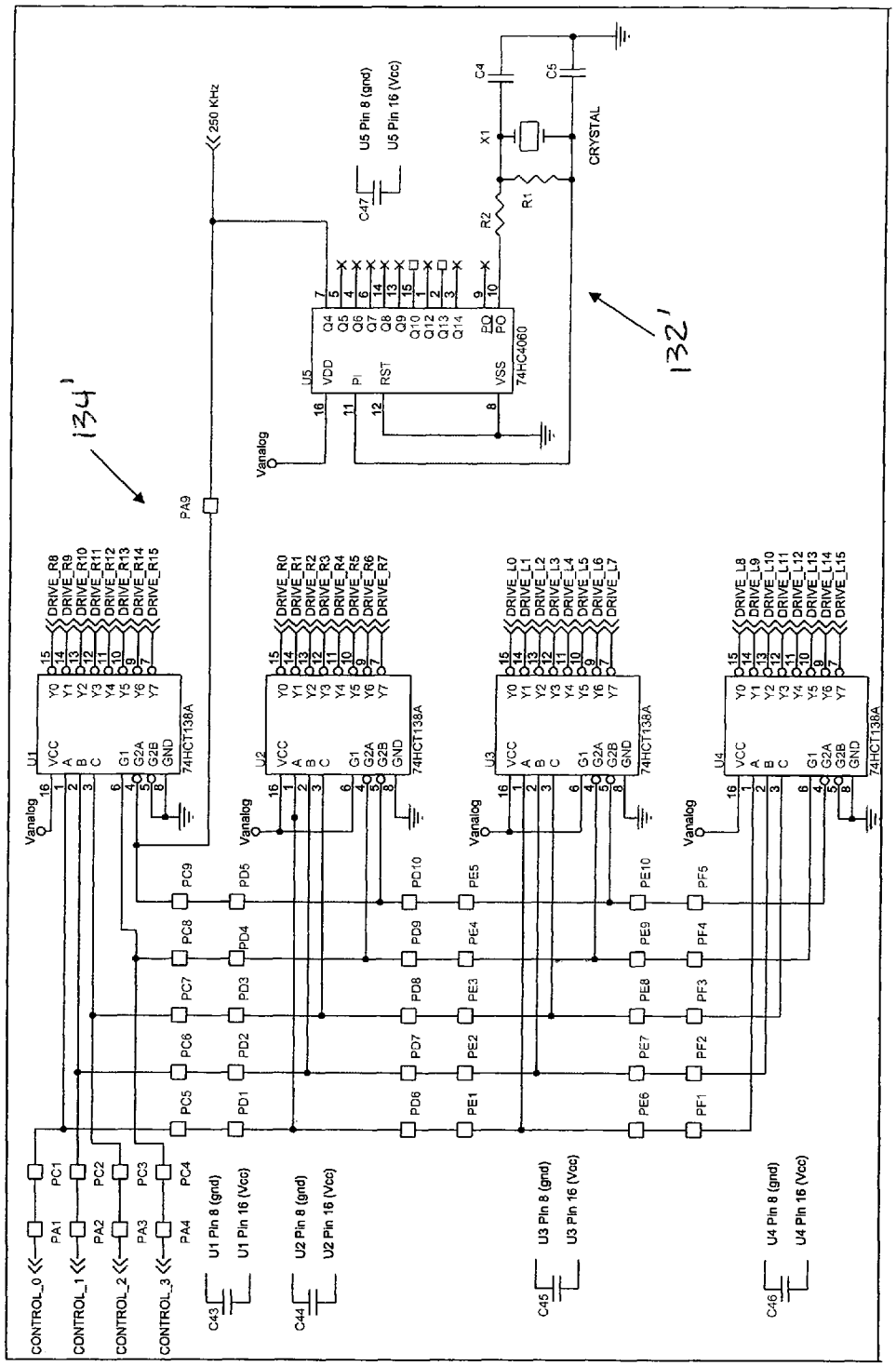
FIG. 15 is a schematic of the oscillating signal generator and column driver circuit of FIG. 14.

Operation of an integrated sensor system of the invention and activation/deactivation of the position and optical sensors will be better understood with respect to the slightly simpler integrated sensor system 100' and its components illustrated in FIG. 14. FIG. 15 depicts embodiments of each of the oscillating signal generator (Signal Oscillator) 132' and column driver circuit 134'. As indicated, the oscillating signal generator 132' is formed with a 74HC4060 chip U5, which is a fourteen stage binary ripple counter with oscillator. It is configured to output the previously referenced 250 KHz radio frequency square wave signal. The column driver circuit 134' is provided by four 74HCT138A chips. As will be recognized by those of ordinary skill, the 74HCT138A chips depicted are configured as three to eight decoders, each with eight output lines Y0-Y7. As can be seen from a comparison of their output line designations and the column trace designations in FIG. 13, a pair of such chips is used to control each set of sixteen column conductive lines 101c of each position sensor matrix 112', 114', chips U3 and U4 for traces L0-L15 of the left matrix 112' via lines 165' in FIG. 14 and DRIVE_L0 through –L15 in FIG. 15 and chips U2 and U1 for the traces R0-R15 of the right matrix 114' via lines 166' in FIG. 14 and DRIVE_R0 through –R15 in FIG. 15. As will be explained, each of a pair of the 74HCT138A chips, chips U2 and U3, that is associated with a separate matrix 112', 114', respectively, is operably connected to eight of the column conductive lines or traces 101c of its respective matrix to drive those lines in sequence, one line each simultaneously in each of the two matrices 112', 114'. Each chip U2, U3 is further operatively connected to the seven optical sensor emitters 124a-124g, 124h-124n associated with that matrix 112', 114', via subsets 165a, 166a of the drive lines 165', 166' whereby the same 74HCT138A chip U2, U3 is used to select and drive column conductive lines 101c of the position sensor matrices 112', 114 and the emitters 126' of the optical emitter circuits 136', 138', respectively, in sequence synchronized order.

Control lines 164' in FIG. 14 from the controller 42' to the column driver circuit 154' are provided by individual lines CONTROL0-CONTROL 3 in FIG. 15. The three binary select inputs (A B C) of each 74HCT138A chip U1-U4 determine which one of eight output lines (Y0-Y7) will go low and that when an enable input G1 is held low or either enable inputs G2A or G2B is held high, the decoding function is inhibited and all outputs go high. As depicted, the G2B input of U1 and U4 is held low by being tied to ground while the G1 inputs of U2 and U3 are held high by being tied to the analog input VCC. The G1 inputs of U1, U4 and the G2A inputs of U2 and U3 are tied to the same high/low input line (CONTROL3) from the controller 42'. In so doing, it will be recognized that the U1 and U4 chips are enabled while the U2 and U3 chips are effectively disabled (the decoding function is inhibited) by a low level output on CONTROL 3 while the enablement/disablement is reversed by a high level output on CONTROL 3. In this way, controller 42' controls which pair of chips U1, U4 or U2, U3 is enabled at any time and which output line of that chip is selected. The 250 KHz radio frequency oscillating signal from oscillating signal generator 132' is applied to the remaining input G2A in U1 and U4 and G2B in U2 and U3 to cyclically enable and disable (actually inhibit the address function of) each chip U1-U4 at the 250 KHz frequency rate of the oscillating signal. This causes whichever output Y0-Y7 being identified by the controller 142' through inputs CONTROL0-CONTROL3/A B C to oscillate between its high and low levels at 250 KHz, effectively driving each identified output Y0-Y7 and each other circuit element connected to each output Y0-Y7, with the radio frequency oscillating signal output by the oscillating signal generator 132' at the frequency rate of that signal. When identified and enabled by controller 42', each individual conductive column line or trace 101c (individually identified as L0-L15 and R0-R16) is driven between high and low levels at the radio frequency rate of the oscillating signal applied by the oscillating signal generator 132' to the column driver circuit 134'. It will be recognized that by the application of a 250 KHz oscillating signal to a column conductive line or trace 101c of either matrix 112', 114', that the trace operates as an antenna and becomes an emitter of a radio signal oscillating at 250 KHz. Since the individual outputs of the four chips U1-U4 are simultaneously identified by the same signals CONTROL0-CONTROL2 from the controller 42', the same numbered right and left traces (e.g. L0/R0) are identified and enabled and driven simultaneously. It will be recognized that same numbered pairs (e.g. L0/R0, L1/R1, L15/R15) are identified and enabled and driven sequentially by the controller 42' through the application of control signals CONTROL0-CONTROL3 to the chips U1-U4 of the column driver circuit 134'.

Figure 16:
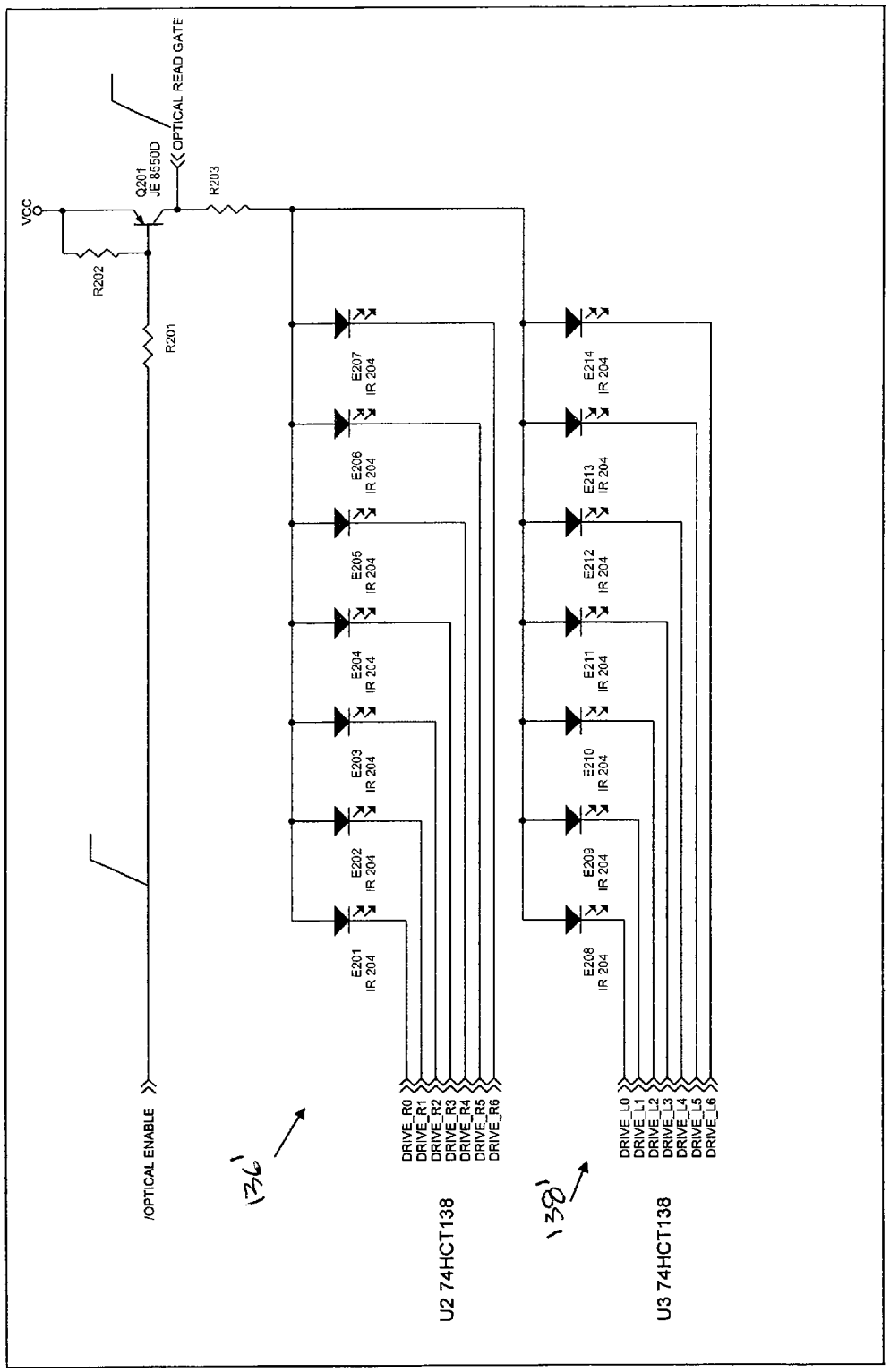
FIG. 16 is a schematic of the optical emitters and their circuits of FIG. 14.

Referring now to FIG. 16, the optical emitter circuits 136', 138' associated with each of the left and right matrices 112, 114 are depicted coupled with a respective output line 165a'/L0-L6 and 166a'/R0-R6 corresponding to outputs Y0-Y6 of chips U2 and U3, respectively, of the column driver circuit 134'. As indicated, each optical emitter 124a-124n is provided by an individual LED, one set individually identified as E201-E207 for the first circuit 136' and another set individually identified as E208-E214 for the second circuit 138'. Both sets of LED's are connected in parallel to a voltage source VCC through a PNP (JE 8550D) transistor Q201. Q201 is enabled by a low level on an optical enable line 160 from controller 42' connected with the base of Q201. The downstream side of each LED E201-E207, E208-E214 is connected with a separate output line R0-R7, L0-L7 of chips U2 and U3 of the column select circuit 134'. Consequently each downstream side of each LED is coupled to an output Y0-Y7 normally held high until selected in the column select circuit 134', at which time it is oscillated high-low at the 250 KHz frequency rate of the output signal of the oscillating signal generator 132'. It will be recognized that when voltage source VCC is connected with the upstream side of the LED's by a low level on optical enable line 160, each LED is energized and activated when the level on its connected L0-L7, R0-R7 line goes low. In this way, each optical emitter 124 is effectively driven at the rate of the radio frequency signal output by oscillating signal generator 132' and the radio frequency oscillating signal output by the oscillating signal generator 132' is effectively applied to each emitter 124a-124n through the column select circuit 134' to drive the emitter 124.

Figure 17:
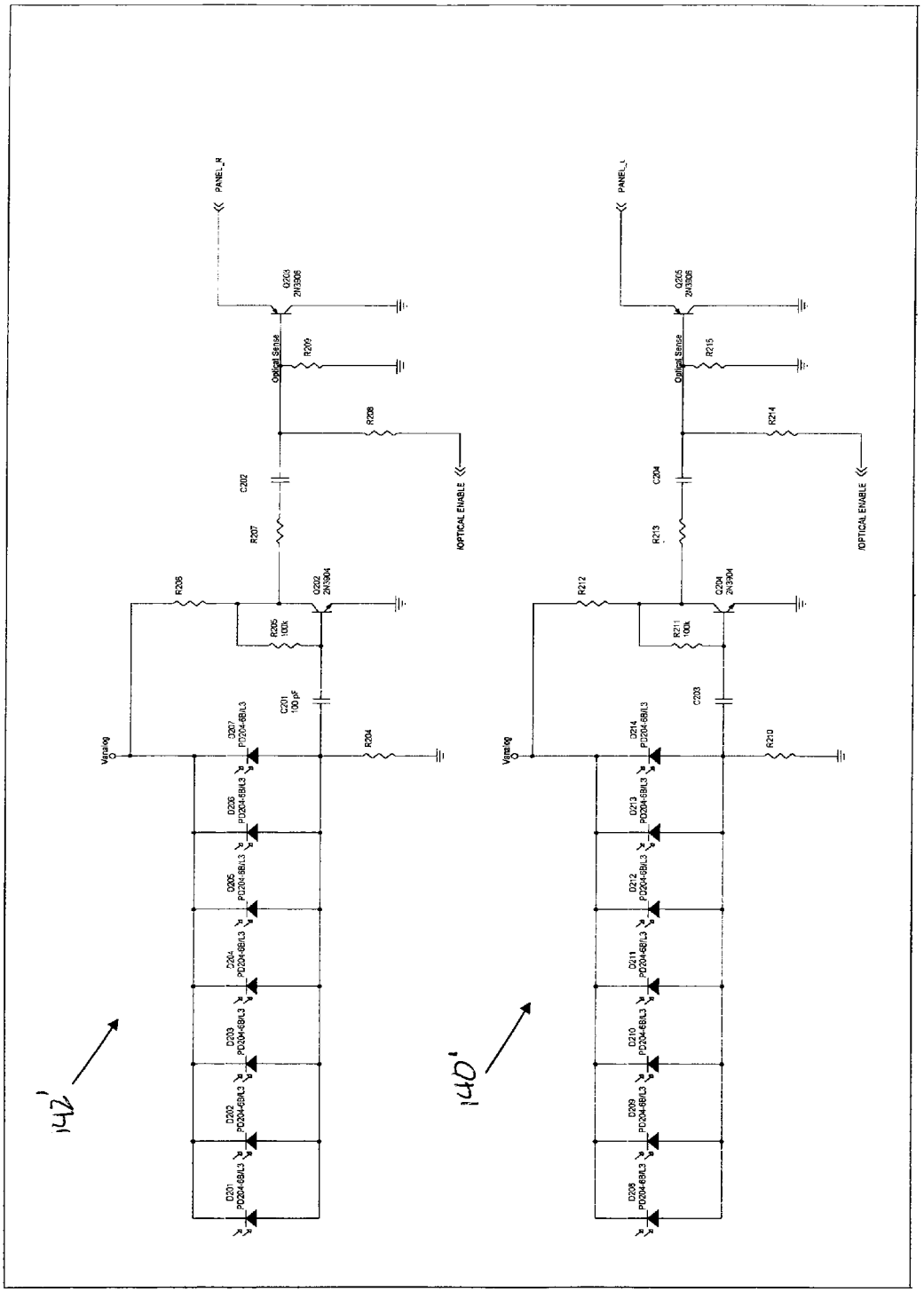
FIG. 17 is schematic of the optical detectors and their circuits of FIG. 14.

FIG. 17 depicts one possible embodiment of optical detector circuits 140', 142'. Optical detectors 126a-126n are provided by individual photodiodes, seven photodiodes D201-D207 and D208-D214 being provided in each optical detector circuit 140', 142', respectively. As depicted, each set of photodiodes D201-D207 and D208-D214 is connected together and with a pair of transistors Q202, Q203 and Q204, Q205, respectively. More specifically, the outputs of the seven photodiodes D201-D207 and D208-D214 are connected in parallel to the base of 2N3904 (NPN) transistors Q202 and Q204, respectively. The collector side of each transistor Q202, Q204 is connected with the base of 2N3906 (PNP) transistors Q203, Q205, respectively, in parallel with the optical enable line 160' from controller 42'. NPN transistors Q202, Q204 are not rendered conductive until one of the photodiodes D201-D207 or D208-D214, respectively, generates a current by exposure to light from an opposing LED E201-E207 or E208-E214. The emitter of each PNP transistor is coupled through a line ("PANEL_R or PANEL_L in FIGS. 17 and 169', 168' in FIG. 14) with the synchronous detector circuit 150'.

Figure 18:
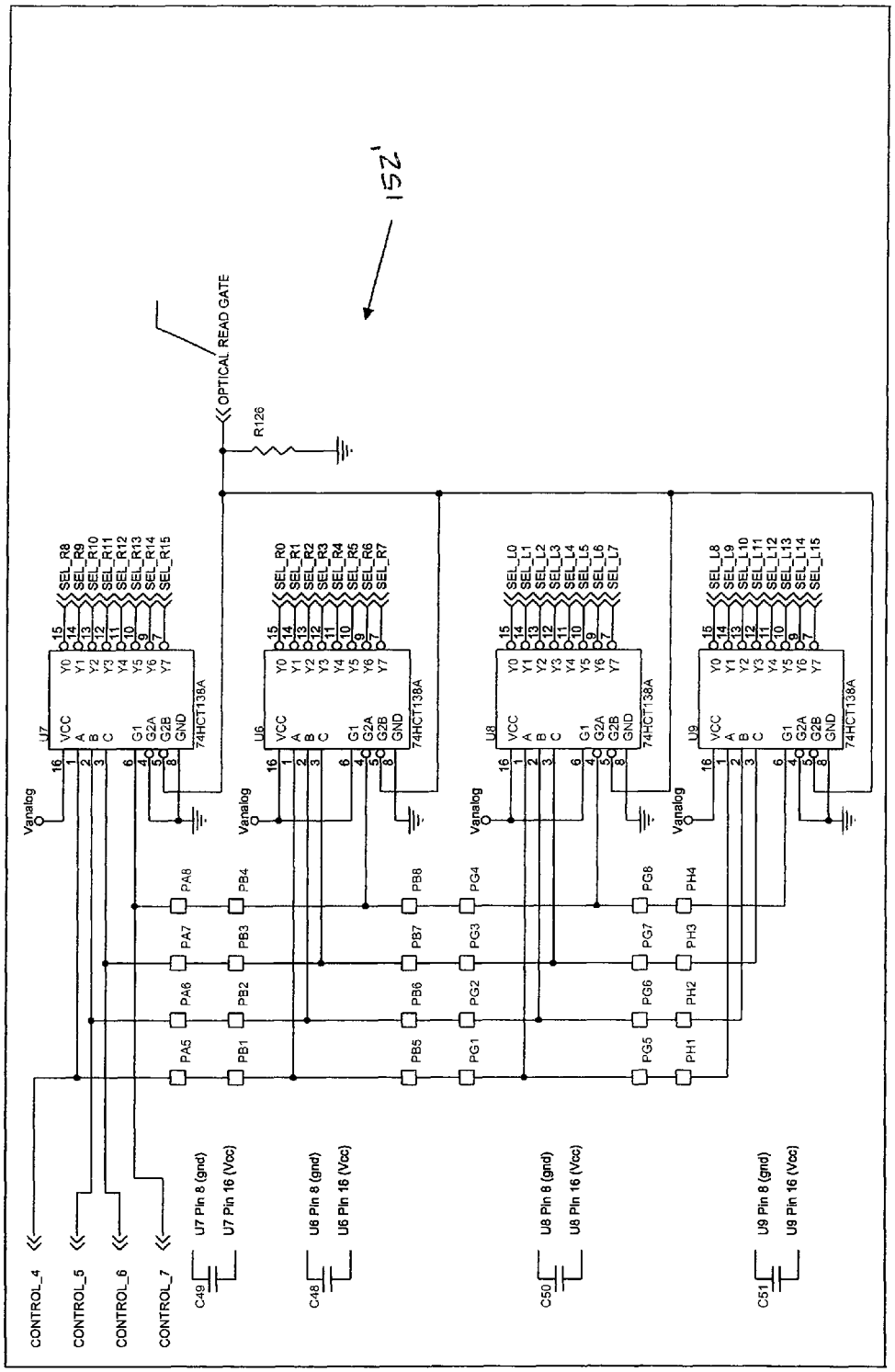
FIG. 18 is a schematic of the row select circuit of FIG. 14.

FIG. 18 depicts a row select circuit 152' embodiment. The circuit 152' is again implemented by four 74HCT138A chips U6-U9 configured as three to eight decoders and controlled by four control lines 162' (CONTROL4-CONTROL7) from controller 42'. Again, CONTROL7 is used to enable/disable pairs of chips, U6 with U8 and U7 with U9, so that each of the sixteen row conductive lines 101r of each matrix 112, 114 can be polled. The third enable input G2B of each chip U6-U9 is coupled with the "OPTICAL READ GATE" line of the optical emitter arrays 136', 138' (FIG. 16). Thus, when the Q201 PNP transistor is rendered conductive, the "OPTICAL READ GATE" line goes high and disables the U6-U9 chips. Consequently, none of the row conductive lines is polled even as the controller continues to cycle through the line and chip selection sequence (CONTROL 4-CONTROL 7).

Figure 19:
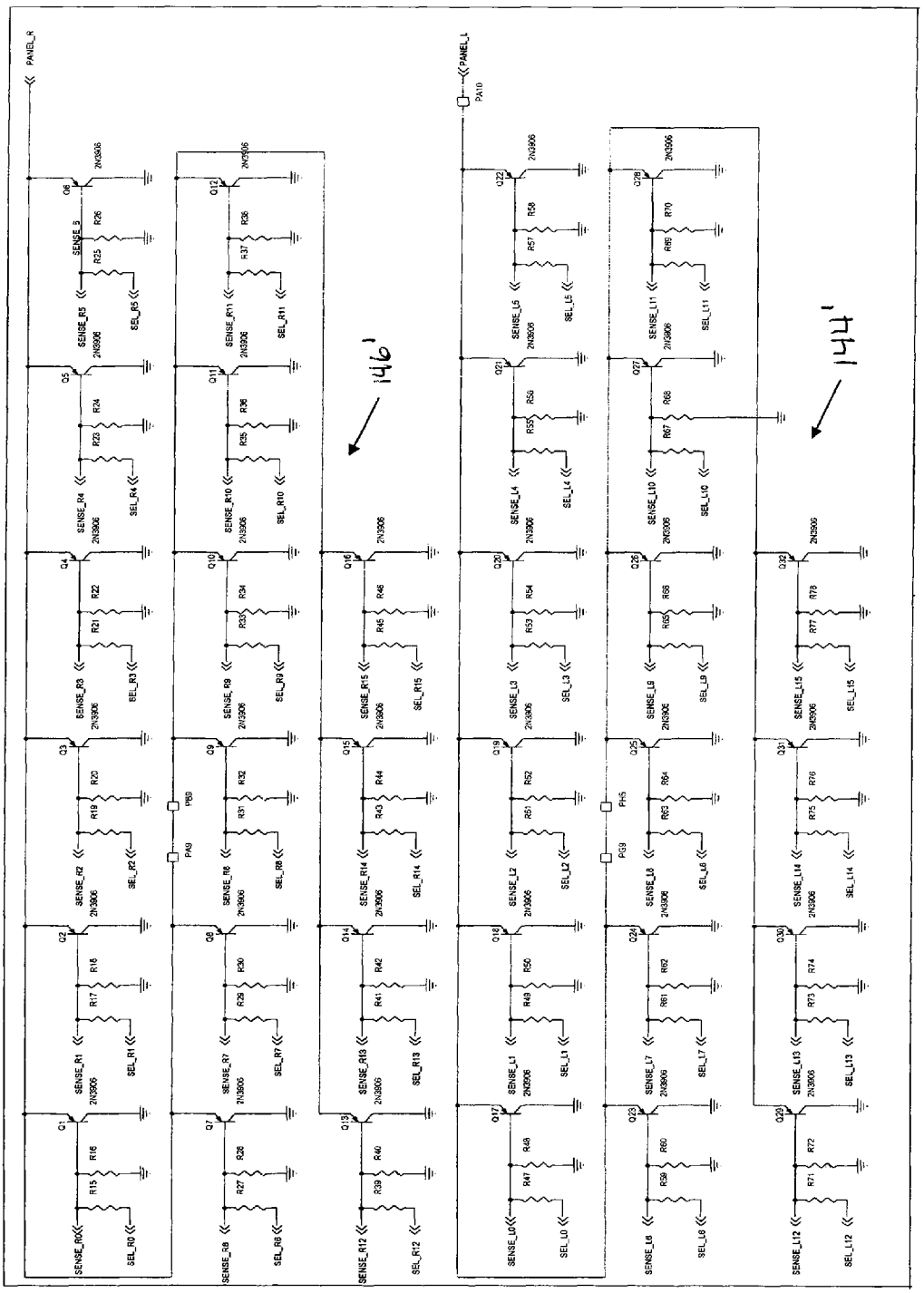
FIG. 19 is a schematic of the sense amplifiers of FIG. 14.

FIG. 19 depicts one embodiment of the row sense ("SENSOR CIRCUIT") circuits 144', 146'. Each circuit 144', 146' is provided by a set of sixteen 2N3906 (PNP) sensing transistors Q1-Q16 and Q17-Q32. Each transistor has an collector side coupled to ground and each has an emitter side coupled in parallel to a single line (PANEL_R or PANEL_L in FIGS. 19 and 19'8 or 168' in FIG. 14) extending to the synchronous detector circuit 150'. As indicated, each row conductive line or trace 101r, identified individually as 0R-15R, 0L-15L, is connected directly with the base of a corresponding sensing transistor Q1-Q16 or Q17-Q32 while a selection output line Y0-Y7 (individually designated SEL_L0-_L15, SEL_R0-_R15) from one of the chips U6-U9 is connected in parallel with a separate corresponding one of the row conductive lines or traces 0R-15R or 0L-15L to the base of the corresponding sensing transistor Q1-Q16 and Q17-Q32. In this way, all of the sensing transistors Q1-Q16 and Q17-Q32 are normally held high by the normally high level outputs on the selection output lines Y0-Y7 from the chips U6-U9 of the row select circuit 152'. When a single trace is identified by the controller 42 through the row select circuit 152', its selection output line Y0-Y7 level goes low making the sense trace 0R-15R or 0L-15L the only enabling voltage applied to the base of the selected sensing transistor Q1-Q16 and Q17-Q32. As is already known to those of ordinary skill, the column conductive lines or sensing traces 0R-15R or 0L-15L are coupled with each driven column conducting line or trace R0-R15 or L0-L15, respectively, by an electromagnetic field radiated by each driven column line/trace 101c and would be to the same extent repeatedly unless the field between them were to be disrupted as it would be by the presence of a finger sufficiently close to the matrix 112 or 114.

Figure 20:
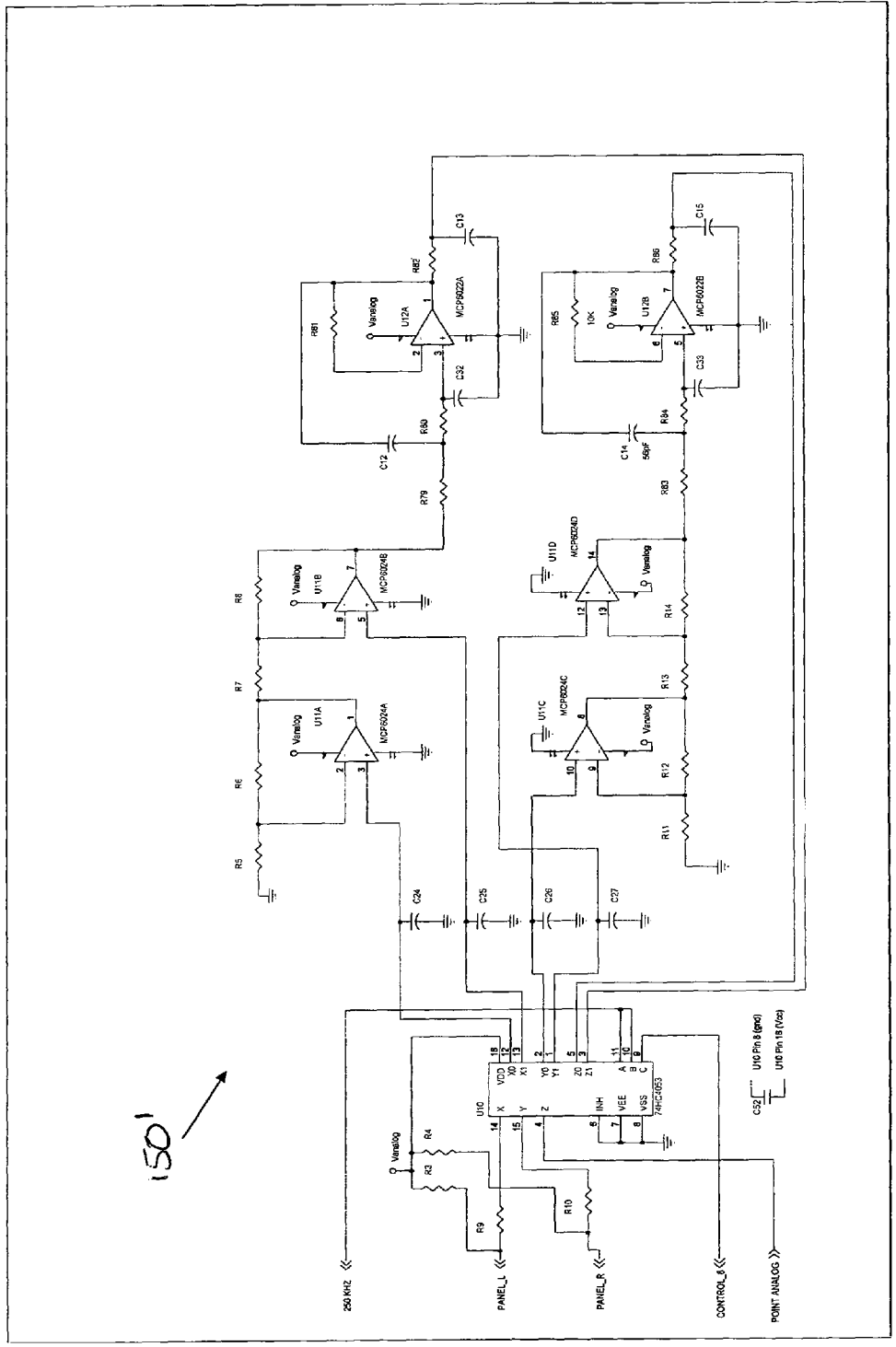
FIG. 20 is a schematic of the detector, multiplexer and filter.

FIG. 20 depicts in block diagram form the synchronous detector, multiplexer, and filter circuit 150'. It is built around a 74HC4053 multiplexer U10 receiving the 250 KHz oscillating signal from the signal generator 132', outputs from the left and right matrices 112', 114' and the left and right optical detector circuits 140', 142' arrays on lines 168 (PANEL-L) and 169 (PANEL_R), respectively, and a control signal (control_8) from the controller 42' and outputs analog data to the controller 42' on the POINT ANALOG line.

Figure 21:
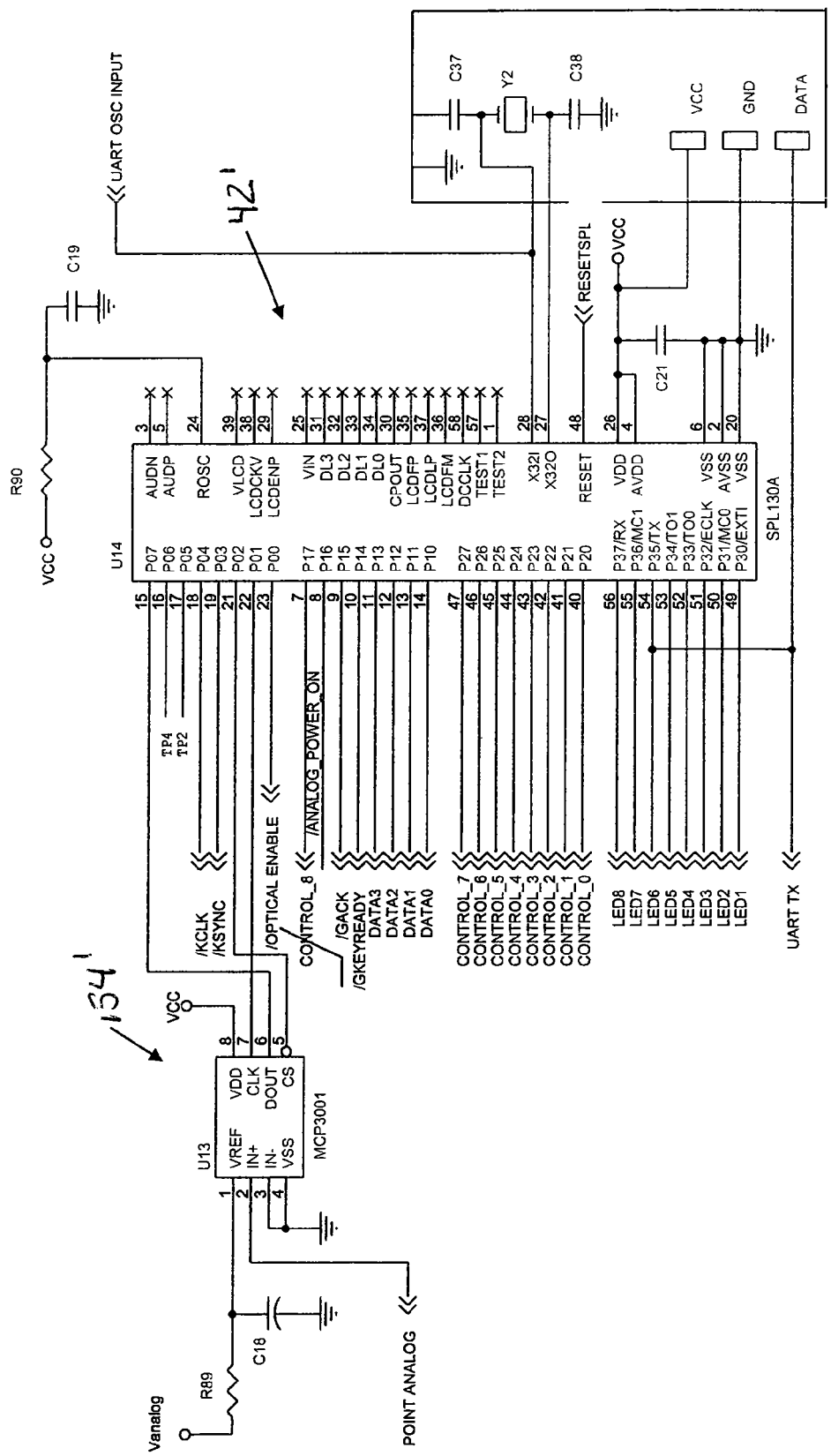
FIG. 21 is a schematic of that portion of the controller controlling operation of the integrated sensor system.

FIG. 21 depicts in block diagram form A/D converter 154 and that portion of the controller 42' that controls the integrated sensor system. A ten bit MCP3001 ADC chip U13 receives the POINT ANALOG line output from the synchronous detector, multiplexer, and filter circuit 150', which are passed to an SPL130A microprocessor based controller chip U14 controlling the operation of the integrated sensor system 100. The various output control lines CONTROL0-CONTROL8 mentioned above and in earlier figures are depicted as are lines LED1-LED8 controlling the mode indicating LED's 40 and lines DATA0-DATA7 communicating with a higher level microprocessor (not depicted) forming part of the controller controlling higher level functions of the device 20.

Status of the emitter-detector pairs 122 corresponding to first through fourteenth hole locations 72a through 72n of each book 60 is communicated to the controller 42 and decoded by the controller in accordance with a decoding table located in the memory 44 to determine which page spread is visible to the user. For example, the page identifiers for the page spreads for the preferred embodiment of the book 60 discussed above and coded in accordance with the encoding shown in FIGS. 4A-4G and FIG. 5 appear to the emitter-detector pairs 122 as shown in FIG. 6A-6G when the book 62 is in the book well 32 and are decoded by the controller 42 in accordance with the decoding table shown in FIG. 7. FIGS. 6A-6G represent bottom plan views of the book 60, as seen by the optical detectors 126a-126n associated with optical sensors 122a-122n, respectively, and are nearly mirror images of FIGS. 4A-4G. The major difference is that foils are visible to the detectors where simple closed hole locations (C) are visible to the user (FIGS. 4A-4G).

From this disclosure, the artisan will recognize that in addition to the above-described encoding of page identifiers, other page identifiers associated with a supplemental book (not illustrated) having, for example, additional page spreads, may be encoded by arrangements of the open-hole locations 74 and closed-hole locations 76 not used in the first through fifteenth page spreads. For example, with reference to FIG. 7, part of a third sequence 84 of page spreads and corresponding page identifiers having open-hole 74 and closed-hole 76 status as shown can be provided. The page identifiers associated with the third sequence 84 can be detected with the optical sensor 120 in a manner consistent with operation of the first and second sequences page identifiers 78 and 80 described above. Other unique page identifiers in addition to those associated with the first, second and third sequences 78, 80 and 82 are possible. These separate sequences can be used in separate books and data for books having different sequences 78, 80, 84, etc. can be stored in the same cartridge 50.

Once the electronic learning system 10 has determined which page spread is viewable by the user, the electronic learning device 20 may initiate an interactive play or learning activity with the user. For example, the electronic learning device 20 may prompt the user to identify a particular graphic image by touching the graphic image with his or her finger. The position sensor 110 allows the electronic learning device 20 to recognize the user's response, and respond in an appropriate manner, for example, with an audible response. The user may proceed to turn the book 60 to another page spread and continue the interactive play or learning experience. Preferably, each individual page spread has graphic images relating to a separate theme, and the queries and responses generated by the electronic learning system 10 correspond to the individual page spread visible to the user. Therefore, a large number of queries and responses corresponding to the plurality of page spreads is possible. Accordingly, the electronic learning system 10 is capable of providing a wide range of play and learning scenarios. From this disclosure, the artisan will recognize that multiple books 60 and corresponding cartridges 50, each directed to a different theme or character, could be provided to further expand the range of play and learning activity possible with the electronic learning system 10.

The electronic learning system 10 preferably includes multiple functional modes selectable using the position sensor 110. For example, in a first functional mode, the electronic learning system 10 may simple recite a story corresponding to written words disposed on the page or pages of the page spread visible to the user. From this disclosure, the artisan will recognize that other functional modes, for example modes designed to teach words, phonics, spelling and/or counting skills could be provided. The displays 40 may be used to indicate in which functional mode the electronic learning device 20 is operating. Further description of the functional modes may be found in co-pending U.S. patent application Ser. No. 10/448,583.

The electronic learning device 20 is preferably capable of audibilizing sound passages without the cartridge 50 inserted into the housing 22 or the book 60 inserted into the book well 32. In a preferred embodiment, a plurality of indicia (not illustrated) corresponding to the English alphabet are disposed on an upper surface of the book well 32. With the electronic learning device 20 turned on, and the cartridge 50 and book 60 removed from the base unit 20, the controller 42 can be configured to respond to a user pressing on the book well 32 to select data corresponding to a sound passage from the base unit memory 44 and to further audibilize the sound passage via the speaker 38. The sound passage might be the name of a letter of the alphabet which the user has just pressed. Alternatively, the sound passage might be a musical note, a series of musical notes, or one or more spoken words.

Figure 9:
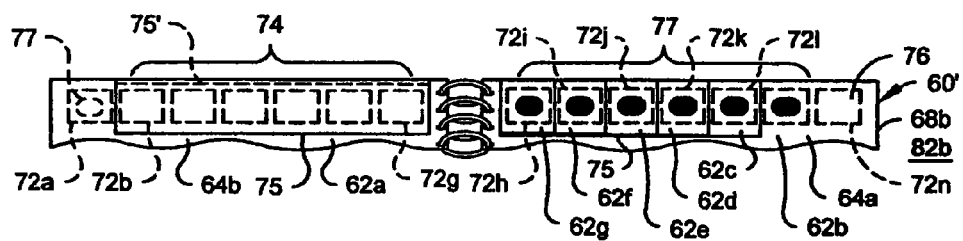
FIG. 9 is a top plan view of an upper portion of an alternate embodiment of the book of the electronic learning system of FIG. 2, showing one of a plurality of page spread configurations of the book and illustrating an alternative embodiment of closed-hole and open-hole locations forming page identifiers corresponding to each of the several page spread configurations.

From this disclosure, the artisan will recognize that the form of the open holes 74 and closed holes 76 is not limited to the form illustrated in FIGS. 2, 4A-4G and 6. Open holes may or may not have a closed perimeter as do the open holes 74 or be individual at each hole location as are the open holes 74 in the first embodiment book 60. With reference now to FIG. 9, a first alternative book 60' is illustrated, showing an upper portion of the second page spread 68*b*. The inventive concepts illustrated in FIG. 9 are not limited to the second page spread 68*b*, but apply to each of the plurality of page spreads. In the first alternative book 60', as is most readily apparent relative with the first page 62*a*, an elongated open perimeter hole in the form of a cutout 75 elongated proximal a free (upper) edge of the page 62*a* is made spanning all of the adjacent locations of open holes 74 in the same page of the first embodiment book 60 of FIG. 4B (that is hole locations 72*b* through 72*g*). Furthermore, the elongated hole could be provided in the form of an elongated slot with a closed perimeter as is indicated in phantom at 75' in FIG. 9. The artisan will recognize that the elongated hole, cutout 75 or slot 75', is operationally equivalent to the plurality of adjoining individual open holes 74 positioned within the consecutive adjoining hole locations 72*b* through 72*g*, as illustrated in FIG. 4B. That is, in operation, the emitter-detector pairs 122 do not distinguish between a single open cutout 75 or slot 75' spanning multiple adjacent open holes 74, for example hole locations 72*b*-72*g* corresponding to page identifier 82*b*, and a plurality of individual open holes 74 in those same hole locations 72*b*-72*g*.

FIG. 9 further illustrates use of elongated openings such as elongated cutouts 75 spanning multiple adjacent open hole locations 74 where multiple pages are stacked on top of one another. A first cutout 75 in second page 62*b* spans hole locations 72*h*-72*l*. A second cutout 75 in third page 62 spans hole locations 72*h*-72*k*. A third cutout 75 in fourth page 62*d* spans hole locations 72*h*-72*j*. In a similar manner, a stair-step pattern is formed, with a cutout 75 in seventh page 62*g* spanning only hole location 72*h*. Again, each of these elongated cutouts could be replaced by elongated slots (not depicted).

Figure 10:
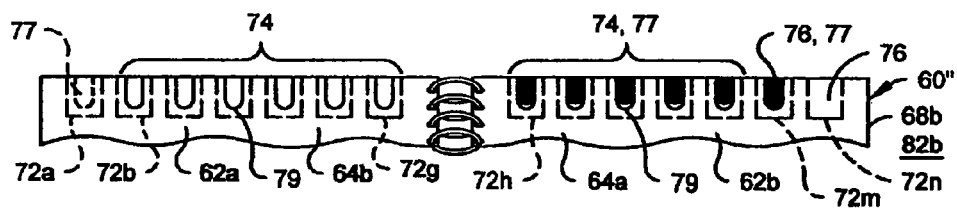
FIG. 10 is a top plan view of an upper portion of another alternate embodiment of the book of the electronic learning system of FIG. 2, showing one of a plurality of page spread configurations of the book and illustrating another alternative embodiment of closed-hole and open-hole locations forming page identifiers corresponding to each of the several page spread configurations.

Finally, with reference now to FIG. 10, a second alternative book 60" is illustrated, showing an upper portion of the second page spread 68*b*. As with FIG. 9, the inventive concepts illustrated in FIG. 10 are not limited to the second page spread 68*b*, but apply to each of the plurality of page spreads. In the second alternative book 60", an open hole location 74 is formed by an individual open perimeter cutout 79 extending inwardly from a free edge (the top edge) of a given page. In this second alternative book 60" the individual cutouts 79 have opposing straight walls extending to a radiused innermost end.

The first and second alternate embodiment books 60' and 60" of FIGS. 9 and 10 serve to illustrate the fundamental point that the open hole locations 74 and closed hole locations 76 can assume a variety of forms. An "open hole" simply indicates that for a given page spread, there is an absence of the page at the open hole location. Thus, when the book 60, 60', 60" is in an operational position (such as within the book well 32), no portion of the page 68 is positioned such that the emitter-detector pair 122 detects page structure within its zone of detection. Similarly, a "closed hole" indicates that when the book 60, 60', 60" is in an operational position (e.g. within the book well 32), a portion of the relevant page of the book 60, 60', 60" is positioned such that the emitter-detector pair 122 detects the portion of the book/page structure. Within these general constraints, the artisan will recognize that many different arrangements of the open hole locations 74 and closed hole locations 76 are possible. For example, in addition to the alternative arrangements shown in FIGS. 9 and 10, the emitter-detectors pairs 122 and the corresponding hole locations 72*a*-72*n* could be arranged proximate one of the other free (i.e. non-hinged) edges, the side edges or bottom edge, of the book 60, 60', 60", or at some other position on the plurality of pages, rather than proximate the top free edge. Furthermore, the page identifier codes could be formed by a combination of multiple alternative forms of the open hole locations and closed hole locations, for example, a combination of the closed perimeter holes 74 of book 60, the open-perimeter cutouts 75 or closed-perimeter slots 75' of the first alternative book 60' and/or the open-perimeter cutouts 79 of the second alternative book 60". Operation of the electronic learning system 10 is similar regardless of the exact form of the open hole locations 74 and closed hole locations 76.

From the foregoing it can be seen that the present invention is an electronic learning device capable of receiving a book having a plurality of page spreads, each page spread having a unique page identifier code. The electronic learning device includes an optical page identification system capable of autonomously identifying each page spread without requiring intervention by the user.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

All references, patent applications, and patents mentioned above are incorporated herein by reference in their entirety and are not to be construed as an admission that any of the of the cited documents constitutes prior art, or as an admission against interest in any manner.

We claim:

1. An electronic learning device for receiving a book having a plurality of successive page spreads, at least one page spread having selectable content and a page spread identifier, the device comprising:
   a housing with an upper surface configured to receive the book;
   a plurality of at least touch-responsive, mutually adjoining individual position sensors organized in a two-dimensional array in the housing beneath the upper surface;
   a plurality of individual optical sensors located in the housing beneath the upper surface so as to face the page spread identifier of the received book, each optical sensor including an optical emitter;
   a microprocessor controller in the housing generating control signals identifying each individual position sensor and each individual optical sensor in a sequence for sequential activation of the individual position and optical sensors; and
   a driver circuit in the housing receiving the control signals from the microprocessor controller, the driver circuit being connected with each individual position sensor of the array and with each individual optical sensor of the plurality and being configured to respond to the control signals from the microprocessor controller to activate the individual position sensors of the array and the individual optical emitters in the sequence.

2. The electronic learning device of claim 1 further comprising an oscillating signal generator outputting a signal oscillating at a radio frequency rate and wherein the driver circuit is connected with the oscillating signal generator and is configured to operably connect the oscillating signal generator with each individual position sensor of the array and each individual sensor of the optical sensor plurality in the sequence.

3. The electronic learning device of claim 2 wherein the driver circuit is configured to operably connect the oscillating signal generator to each individual position sensor of the array and to each individual sensor of the optical sensor plurality by outputting to each individual position sensor and to each individual optical sensor, an activation signal oscillating at the radio frequency rate.

4. The electronic learning device of claim 2 wherein each individual sensor of the optical sensor plurality includes a detector to detect light from the emitter and wherein the driver circuit applies the oscillating signal from the oscillating signal generator to the emitter of each optical sensor in the sequence whereby each optical sensor emitter is driven in oscillation at the radio frequency rate.

5. The electronic learning device of claim 2 wherein the driver circuit comprises at least one digital decoder chip simultaneously connected with the controller, the oscillating signal generator, a set of the plurality of individual optical sensors and a set of the plurality of individual position sensors.

6. The electronic learning device of claim 1 further comprising a detector circuit operably connected between the controller and the plurality of individual position sensors and the plurality of individual optical sensors and configured to detect operation of a set of the plurality of individual position sensors and a set of the plurality of the optical sensors driven by the driver circuit in sequence.

7. The electronic learning device of claim 6 wherein the detector circuit is operably connected with the set of the plurality of individual position sensors and with the set of the plurality of individual optical sensors through a single input line shared by the set of the plurality of individual position sensors and the set of the plurality of individual optical sensors.

8. The electronic learning device of claim 7 further comprising an analog to digital converter operably connecting all of the plurality of position sensors and all of the plurality of optical sensors with the controller through the detector circuit.

9. An electronic learning device comprising:
   a page having an optical identification code and selectable content;
   a housing configured to support the page;
   an optical sensor located in the housing so as to irradiate and detect the optical identification code;
   a position sensor separate from the optical sensor and located in the housing so as to detect a location of content selected from the selectable content;
   a controller in the housing operatively connected directly with the optical sensor and with the position sensor and configured to sequence synchronize the irradiation and detection of the optical identification code with the detection of the location of the selected selectable content; and
   an audible output device controlled by the controller to produce an audible response associated with the selectable content in response to the page being supported by the housing and selectable content from the page being selected.

10. The electronic learning device according to claim 9, wherein the position sensor comprises a plurality of at least touch-responsive, mutually adjoining individual position sensors organized in a two-dimensional array for selectable content selection location and wherein the optical sensor comprises a separate plurality of individual optical sensors configured for page identification.

11. The electronic learning device according to claim 10 further comprising a driver circuit operably connected with each of the plurality of individual position sensors and with each of the plurality of individual optical sensors to identify and sequentially activate each of the plurality of individual position sensors and each of the plurality of individual optical sensors.

12. The electronic learning device according to claim 11 further comprising an oscillating signal generator outputting an oscillating signal oscillating at a radio frequency rate and operably connected with the optical sensors by the driver circuit for sequential activation of the optical sensors with an activation signal oscillating at the radio frequency rate.

13. The electronic learning device according to claim 12 wherein each individual optical sensor has an emitter and wherein the driver circuit applies the activation signal to the emitter of each individual optical sensor in sequence to drive each optical sensor emitter at the radio frequency rate with the activation signal for operation.

14. The electronic learning device according to claim 11 wherein the oscillating signal generator is operably connected with each of the plurality of individual position sensors by the driver circuit for sequential activation of the individual position sensors with an activation signal.

15. The electronic learning device according to claim 14 wherein each individual position sensor has an emitter and wherein the activation signal is applied by the driver circuit to the emitter of each individual position sensor in sequence and drives each emitter of each individual position sensor for operation at a radio frequency rate.

16. The electronic learning device according to claim 11 wherein the position sensor is formed by an array of separate and separated first and second sets of generally parallel, individual conductive lines transversely crossing over each other beneath an upper surface of the housing, and wherein the driver circuit operably connects the radio frequency oscillating signal generator with individual conductive lines of the first set of the position sensor to enable sequence synchronized operation of the individual conductive lines of the first set of the position sensor.

17. The electronic learning device according to claim 9 further comprising a digital decoder operably connected with the optical sensor to enable sequential irradiation of the optical identification code.

18. The electronic learning device according to claim 9 further comprising a radio frequency oscillating signal generator operably with the optical sensor to drive the optical sensor at a radio frequency rate to irradiate the optical identification code.

\* \* \* \* \*